(12) United States Patent
Bhagavatula et al.

(10) Patent No.: US 9,553,901 B2
(45) Date of Patent: Jan. 24, 2017

(54) VOIP SERVICE WITH STREAMLINED CALL TRANSFER OPTIONS

(75) Inventors: Satish Bhagavatula, Chandler, AZ (US); Manish Rao, Phoenix, AZ (US)

(73) Assignee: CREXENDO, INC., Tempe, AZ (US)

( * ) Notice: Subject to any disclaimer, the term of this patent is extended or adjusted under 35 U.S.C. 154(b) by 68 days.

(21) Appl. No.: 13/560,765

(22) Filed: Jul. 27, 2012

(65) Prior Publication Data

US 2014/0029478 A1   Jan. 30, 2014

(51) Int. Cl.
*H04L 12/16* (2006.01)
*H04L 29/06* (2006.01)
*H04L 12/58* (2006.01)

(52) U.S. Cl.
CPC ....... *H04L 65/1096* (2013.01); *H04L 65/1053* (2013.01); *H04L 51/24* (2013.01)

(58) Field of Classification Search
CPC ....... H04L 12/16; H04L 65/1013; H04W 4/16; H04M 1/2473; H04M 7/006
USPC ............... 370/259, 271, 352, 212.01, 212.02
See application file for complete search history.

(56) References Cited

U.S. PATENT DOCUMENTS

| | | | | |
|---|---|---|---|---|
| 8,036,362 B1* | 10/2011 | Skinner | ............... | H04M 3/4211 |
| | | | | 379/211.01 |
| 8,054,963 B2* | 11/2011 | Kung | ..................... | H04M 3/54 |
| | | | | 370/352 |
| 2004/0066916 A1* | 4/2004 | Brown et al. | ............. | 379/88.01 |
| 2005/0073964 A1 | 4/2005 | Schmidt et al. | | |
| 2005/0152515 A1* | 7/2005 | Amir et al. | ................ | 379/88.13 |
| 2005/0243809 A1 | 11/2005 | Best et al. | | |
| 2006/0034266 A1* | 2/2006 | Harris et al. | .................. | 370/356 |
| 2006/0227957 A1* | 10/2006 | Dolan et al. | ............. | 379/212.01 |
| 2007/0220275 A1 | 9/2007 | Heitzeberg et al. | | |
| 2008/0069327 A1 | 3/2008 | Kingsley et al. | | |
| 2009/0141882 A1* | 6/2009 | Baeza | ................... | H04M 3/548 |
| | | | | 379/211.02 |
| 2009/0220064 A1 | 9/2009 | Gorti et al. | | |
| 2009/0268895 A1* | 10/2009 | Emerson | ................ | H04M 3/54 |
| | | | | 379/212.01 |
| 2009/0286514 A1* | 11/2009 | Lichorowic et al. | ...... | 455/412.2 |
| 2009/0305683 A1* | 12/2009 | Gupta et al. | .................. | 455/417 |
| 2010/0254370 A1* | 10/2010 | Jana et al. | ..................... | 370/352 |
| 2010/0254375 A1 | 10/2010 | Feuerhahn et al. | | |
| 2010/0279675 A1 | 11/2010 | Slack et al. | | |
| 2011/0022968 A1 | 1/2011 | Conner et al. | | |
| 2011/0026701 A1* | 2/2011 | Kirchhoff et al. | ....... | 379/207.13 |
| 2011/0182283 A1 | 7/2011 | Van Buren et al. | | |

(Continued)

OTHER PUBLICATIONS

U.S. Appl. No. 13/560,776, Office Action dated Jul. 18, 2014.

(Continued)

*Primary Examiner* — Man Phan
*Assistant Examiner* — Ryan Kavleski
(74) *Attorney, Agent, or Firm* — Conley Rose, P.C.

(57) ABSTRACT

In at least some embodiments, a system includes at least one server to manage voice over internet protocol (VOIP) services. The managed VOIP services provided by the at least one server include a telephony service to establish a calling phase between an initiator device and a mobile target device in response to a call command received from the initiator device, and a streamline call transfer service to transfer a call from the mobile target device to a transfer target device in response to a one-touch transfer command received from the mobile target device during the calling phase.

29 Claims, 18 Drawing Sheets

(56) References Cited

U.S. PATENT DOCUMENTS

| | | |
|---|---|---|
| 2011/0271209 A1 | 11/2011 | Jones et al. |
| 2012/0166545 A1 | 6/2012 | Alexandrov et al. |
| 2012/0264427 A1 | 10/2012 | Adatia et al. |
| 2012/0327812 A1* | 12/2012 | Xiao et al. ............ 370/259 |
| 2013/0086650 A1 | 4/2013 | Soundrapandian et al. |
| 2013/0262594 A1 | 10/2013 | Bastide et al. |

OTHER PUBLICATIONS

U.S. Appl. No. 13/560,784, Office Action dated Sep. 8, 2014.
U.S. Appl. No. 13/560,776, Office Action dated Sep. 30, 2015 (26 pages).
U.S. Appl. No. 13/560,776, Final Office Action dated Feb. 10, 2015 (26 pages).
U.S. Appl. No. 13/560,784, Response to Office Action dated Sep. 8, 2014, filed Jan. 8, 2015 (18 pages).
U.S. Appl. No. 13/560,776, Response to Office Action dated Jul. 18, 2014, filed Oct. 20, 2014 (14 pages).
U.S. Appl. No. 13/560,784, Final Office Action dated May 8, 2015 (20 pages).
U.S. Appl. No. 13/560,776, Request for Continued Examination and Preliminary Amendment in Response to Final Office Action dated Feb. 10, 2015, filed May 11, 2015 (15 pages).
U.S. Appl. No. 13/560,776, Response to Office Action dated Sep. 30, 2015, filed Dec. 29, 2015 (13 pages).
U.S. Appl. No. 13/560,784, Response to Final Office Action dated May 8, 2015, filed Jul. 8, 2015 (16 pages).
U.S. Appl. No. 13/560,784, Advisory Action dated Aug. 3, 2015 (6 pages).
U.S. Appl. No. 13/560,784, Request for Continued Examination and Preliminary Amendment in Response to Final Office Action dated May 8, 2015, filed Aug. 10, 2015 (17 pages).
U.S. Appl. No. 13/560,784, Office Action dated Jan. 8, 2016 (23 pages).
U.S. Appl. No. 13/560,784, Response to Office Action dated Jan. 8, 2016, filed Apr. 8, 2016 (15 pages).

* cited by examiner

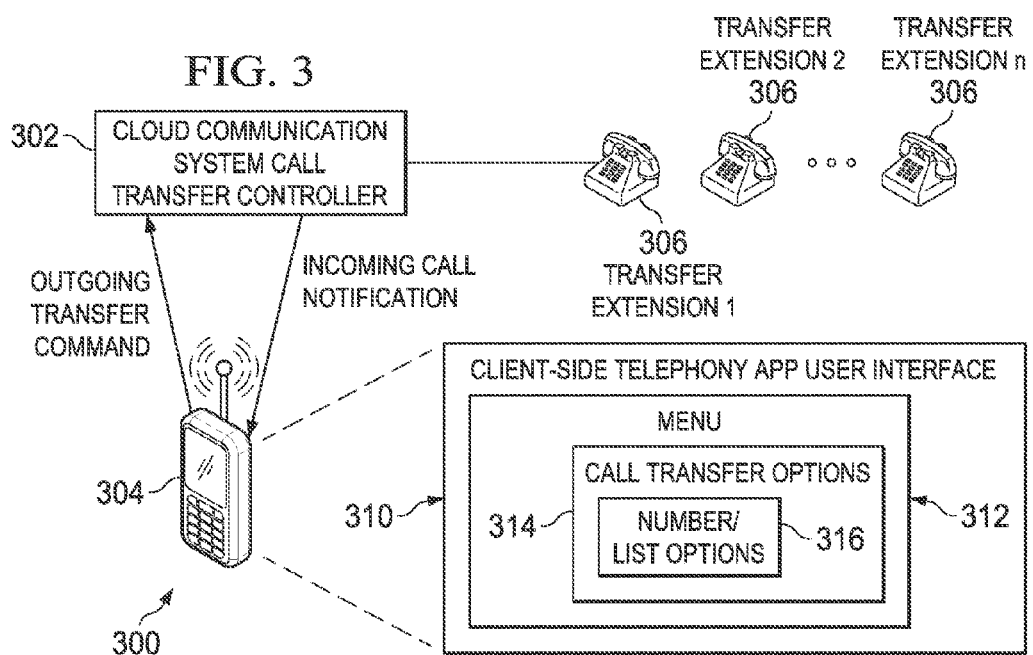
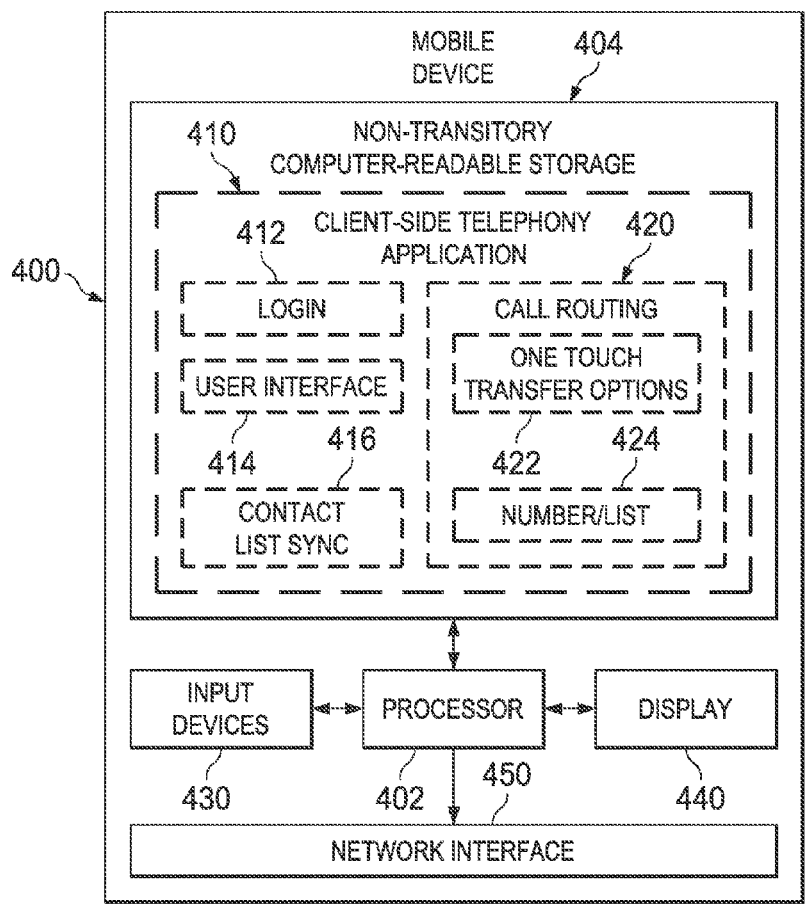

VOIP SERVICE WITH STREAMLINED CALL TRANSFER OPTIONS

BACKGROUND

The ongoing proliferation of wireless smart phones or other mobile devices has provided both public and private users with an unprecedented variety of functions that have extended the reach of dozens of voice and data applications to mobile users. Many of these capabilities, provided by downloadable software applications, provide users of mobile devices with a wide range of specialized functions. Just as in the case of a desktop computer, mobile devices now support a large number of concurrent processes that can be installed to run in the background or on an as-needed basis. The choice of which applications are installed and running are up to the user.

One useful feature of mobile devices in a business environment is taking office calls while traveling. While many private branch exchange (PBX) systems offer a wide selection of call forwarding and call pickup arrangements to transfer calls to mobile devices under a variety of conditions, what is needed is an effective and novel solution that allows the mobile user to quickly send ringing calls back to an office or other transfer target.

BRIEF DESCRIPTION OF THE DRAWINGS

For a detailed description of exemplary embodiments of the invention, reference will now be made to the accompanying drawings in which:

FIG. 3 shows a streamlined call transfer operation for VOIP services in accordance with an embodiment of the disclosure;

FIG. 4 shows a mobile device in accordance with an embodiment of the disclosure;

NOTATION AND NOMENCLATURE

Figure 1:
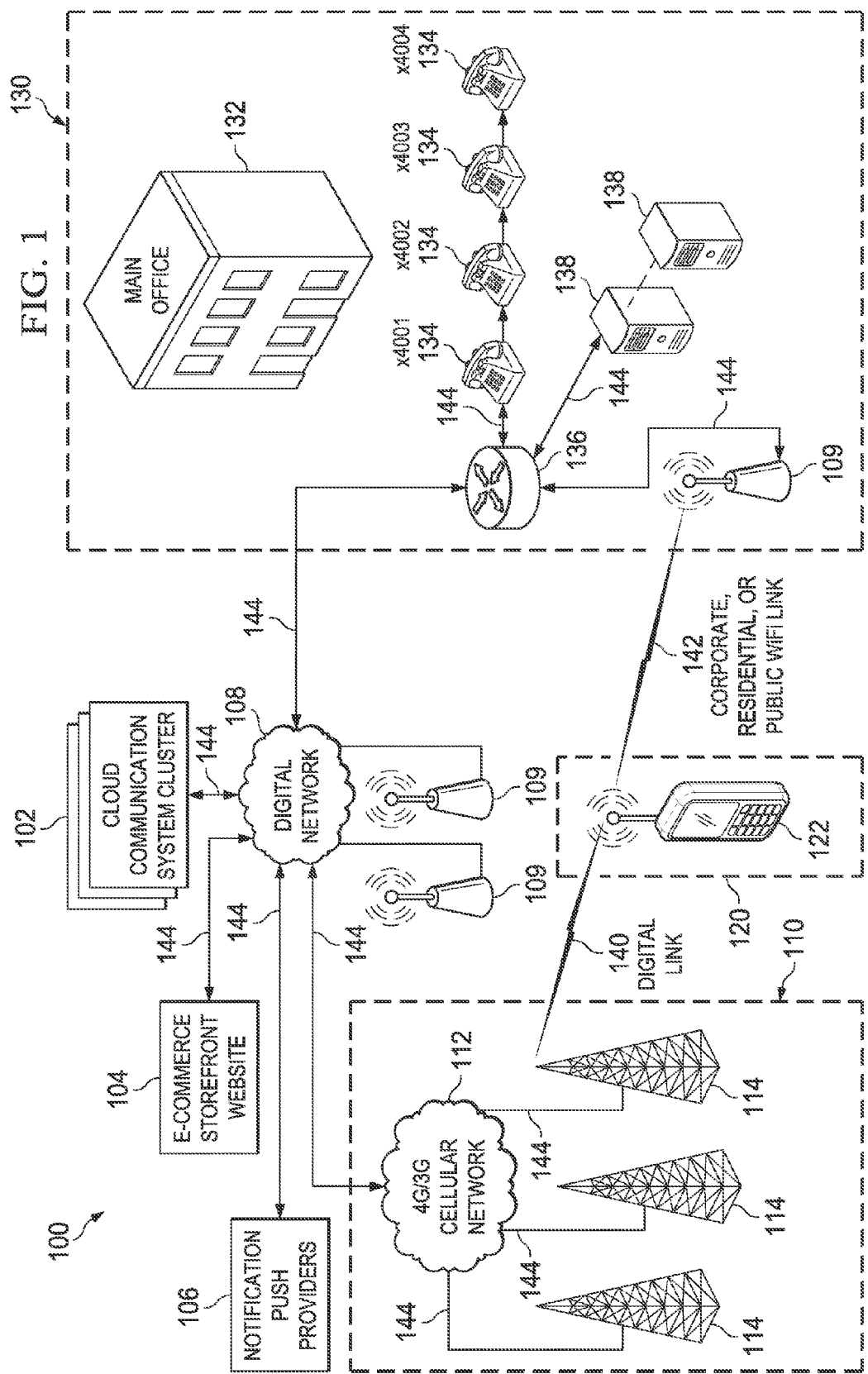
FIG. 1 shows a block diagram of a network environment in accordance with an embodiment of the disclosure.

Certain terms are used throughout the following description and claims to refer to particular system components. As one skilled in the art will appreciate, individuals and organizations may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to methods and systems to set up and manage streamlined call transfer options of a cloud-based Voice Over Internet Protocol (VOIP) service extended to mobile devices. While various examples of managing streamlined call transfer options for a cloud-based VOIP service are provided, the examples disclosed should not be interpreted, or otherwise used, as limiting the scope of the disclosure, including the claims. In addition, one skilled in the art will understand that the following description has broad application, and the discussion of any particular example is not intended to intimate that the scope of the disclosure, including the claims, is limited to that example.

The streamlined call transfer features of a VOIP service as described herein are based on server-side VOIP operations and client-side VOIP operations, where at least some of the clients correspond to mobile devices. Each such mobile device may perform client-side VOIP operations, including the streamlined call transfer options disclosed herein, by executing a telephony application (T-App). In at least some embodiments, the VOIP service is provided for an enterprise or group of users. Such users may be members of an enterprise or other organization that subscribes to commercially selected and procured communication features associated with a VOIP service. As such, a contact list corresponding to the enterprise or organization may be utilized when the streamlined call transfer options are selected.

In some embodiments, the streamlined call transfer features of the VOIP service is used to direct incoming calls arriving at a mobile device to one or more predetermined telephone numbers or extensions. The streamlined call transfer feature available to the mobile device may direct transfers to the same telephone number or extension that is set up for the mobile device user's place of business. Alternatively, the streamlined call transfer feature available to the mobile device may direct transfers to a different telephone number or extension than what is set up for mobile device user's place of business. Without limitation to other embodiments, as new calls arrive, a call interface (e.g., a popup menu) may give the user a list of choices regarding how to handle the call. In a single press of a button or icon, the call may be sent to a transfer target, a conference call, an intermediary, a voice mail, or answered live.

If streamlined call transfer features of the VOIP service are already set up for the mobile device user's place of business, then installation of the T-App on the mobile device may including a configuration synchronization whereby the same configuration of call transfer features as what is set up for the mobile device user's place of business is available on the mobile device. Additionally, the user of the mobile device may access a user interface for the T-App installed on the mobile device to update streamlined call transfer features for the VOIP service. For example, the mobile device user may update a transfer availability option, a transfer target option, a transfer message option, an intermediary annotation option, and/or an announcement call option related to the streamlined call transfer features of the VOIP server as described herein. Such updates may be transmitted to a VOIP server to enable proper server-side operations to support the streamlined call transfer features. The transmission of updates may occur when the updates are selected, or in response to a scheduled or unscheduled sync operation. In some embodiments, such streamlined call transfer option updates may be including with a one-touch call transfer command transmitted by a mobile device to a VOIP server as described herein. As needed, a user may be able to install the T-app on a new mobile device and maintain previously established streamlined call transfer features, by synchronizing the previously established streamlined call transfer features with the new mobile device. The previously established streamlined call transfer features may be stored by the VOIP server and may be assigned to a user account (e.g., as a subscription) for the VOIP service independent of the mobile device. To access the VOIP service, including the streamlined call transfer features, a login or other authentication interface is provided for the VOIP service.

The operation of the VOIP service, including the streamlined call transfer features disclosed herein, depends on the availability of hosted communication services and mobile users who are connected to a "data service" via digital connections that are routed back to an Internet cloud. As long as a reliable digital path back to the host services is at a reasonable bit rate, the functionality described herein enables users to transact seamless communication features from their mobile devices regardless of the network that is used for communications.

It is common for mobile devices to have access to a large library of downloadable applications that, when purchased via electronic financial transactions or copied from another device, perform wide variety of functions such as games, GPS searches, storefront shopping, chat groups, etc. These applications are normally purchased en masse under a one-size-fits-all concept and are implemented in languages like JAVA to make them more interoperable between platforms, thus increasing the user base. Specifically, when an application is run, customization options are entered by the user and saved while the app is running. From that point on, the operation of the applications changes depending on the user-defined preferences. A customization process is disclosed herein to facilitate the usage of a telephony application without having to spend excessive time on local configurations that must be repeated over and over. In some embodiments, customized VOIP service features including streamlined call transfer features are included as part of a downloaded application at the time a subscription is activated from an online service.

FIG. 1 shows a block diagram of a network environment 100 in accordance with an embodiment of the disclosure. In the network environment 100, a hosted (or virtual) cloud communication system cluster 102 controls the disclosed VOIP service and streamlined call transfer features for both wired and wireless devices via a communication structure including a combination of Internet (cloud) networks 108, push notification providers 106, e-commerce storefront websites 104, hard wired connections 144, cellular network (e.g., 4G/3G) 112, digital link 140, and/or Wi-Fi links 142 to mobile users. The designation of hard wired connections 144 and other types of links in the network environment 100 is intended to represent a suitable configuration rather than a requirement.

In FIG. 1, a mobile device layer 120 is able to communicate with the cloud communication system cluster 102 for VOIP services as disclosed herein via a cellular network layer 110 and/or an enterprise layer 130. More specifically, the mobile device 122 may implement a wireless transceiver to communicate with at least one base station 114 of the cellular network layer 110 via a digital link 140. The base stations 114 couple to a cellular network 112 (e.g., a 4G/3G network), which communicates with the cloud communication system cluster 102 via the digital network 108. The cellular network layer 110 provides wireless services on a wide area basis to subscribers using services such as cellular plans and data plans. The interconnected series of base stations 114 and switching centers provide a communication path for users on the go (roaming) to connect to VOIP services provided by the cloud communication system cluster 102. Integration initiatives between cellular networks 112 and other types of networks have allowed certain communication features to be seamlessly extended to the Internet via cloud connections.

The wireless transceiver of the mobile device 122 also may enable communications with at least one Wi-Fi network 109 that links the mobile device 122 to the enterprise layer 130. As shown, the enterprise layer 130 may comprise at least one Wi-Fi network 109, a router 136, computer systems 138, and/or fixed telephony devices 134. Without limitation to other embodiments, some or all of these enterprise layer components may be installed in an office building 132 associated with an enterprise. As shown, the router 136 communicates with the cloud communication system cluster 102 via the digital network 108. The digital network 108, sometimes referred to herein as the Internet or "cloud", enables ongoing communications between all the connected entities using a communication protocol such as transmission control protocol/internet protocol (TCP-IP) or user datagram protocol (UDP). Such communications are provided, for example, by a public carrier service that is available by subscribing to an Internet Service Provider (ISP).

Without limitation to other embodiments, various criteria for the networked system 100 include use of virtual or cloud private branch exchange (PBX) technology for system functions. Further, the networked system 100 may support a mobile device user that is associated with multiple wireless devices or wired devices. Further, the network system 100 enables registration and pre-configuration of VOIP services and streamlined call transfer features to be utilized by the mobile device 122. Further, the mobile device 122 may correspond to one of many possible brands of cell phones or smart phones.

To summarize, the networked system 100 enables the mobile device 122 to receive/make calls based on the VOIP service provided by the cloud communication system cluster 102. As disclosed herein, the VOIP service includes streamlined call transfer features that may be utilized, updated, enabled or disabled based on communications between the mobile device 122 and other components in the networked system 100.

Figure 2:
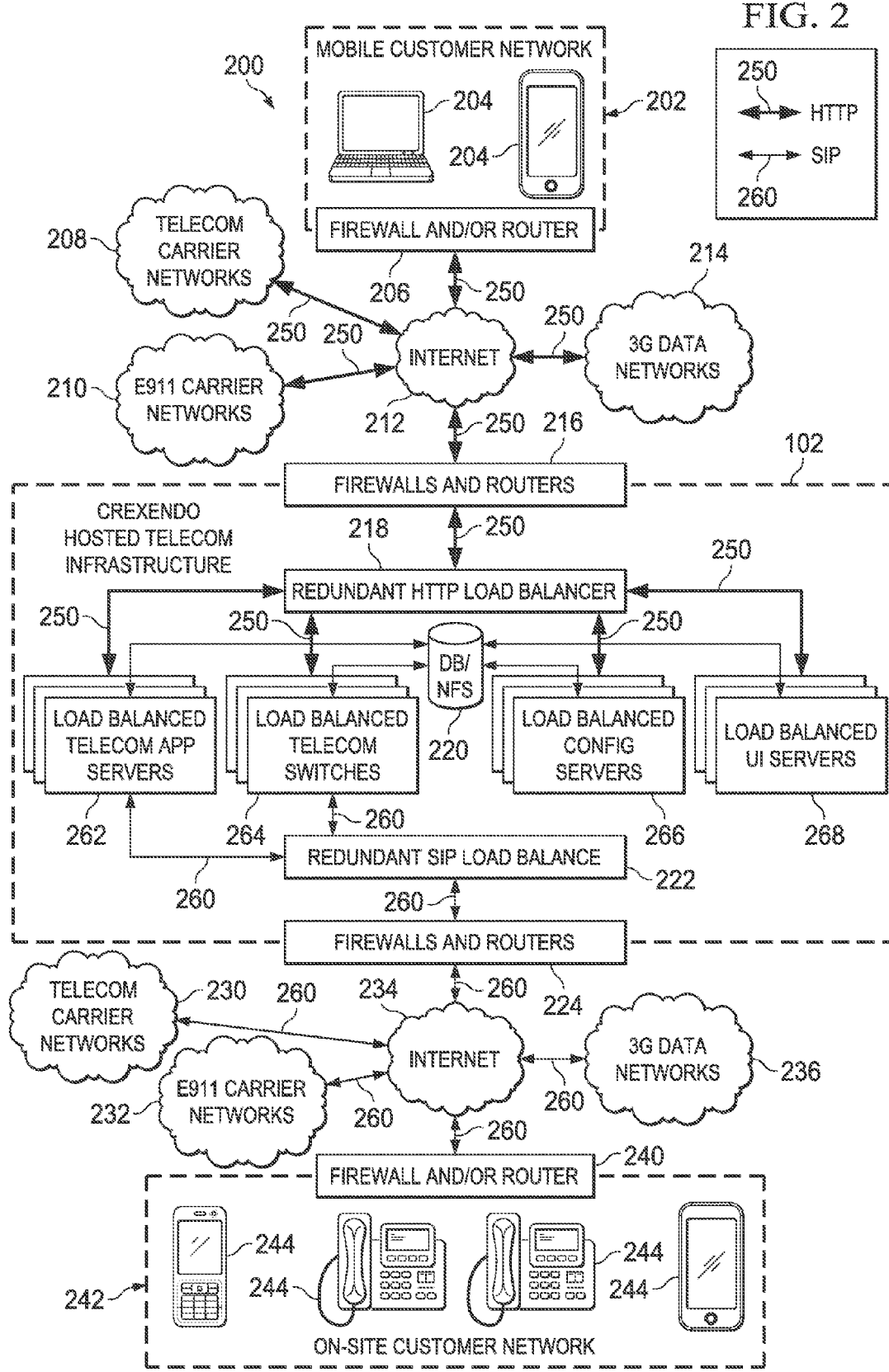
FIG. 2 shows a block diagram of a system to support Voice Over Internet Protocol (VOIP) services in accordance with an embodiment of the disclosure.

FIG. 2 shows a block diagram of a system 200 to support VOIP services in accordance with an embodiment of the disclosure. The system 200 comprises the cloud communication system cluster 102 mentioned for FIG. 1 as well as other components. As shown, the cloud communication system cluster 102 comprises firewalls/routers 216 and 224 that filter and manage the transfer of data packets into and out of the cloud communication system cluster 102. Such data packets include communications to/from devices 204 of a mobile customer network 202 (e.g., corresponding to mobile and remote users) and communications to/from devices 244 that are part of an on-site customer network 242 (e.g., corresponding to users at an enterprise office location).

As an example, data packets from devices 204 of the mobile customer network 202 may be directed to the cloud communication system cluster 102 via a firewall/router 206 associated with the mobile customer network 202 and via the Internet 212 using hypertext transfer protocol (HTTP)

links 250. Various networks such as telecom carrier networks 208, E911 carrier networks 210, and 3G data networks 214 may communicate via the Internet 212 to the devices 204 of the mobile customer network 202 and/or to the cloud communication system cluster 102 using HTTP links 250. Similarly, data packets from devices 244 of the on-site customer network 242 may be directed to the cloud communication system cluster 102 via a firewall/router 240 associated with the on-site customer network 242 and via the Internet 234 using session initiation protocol (SIP) links 260. Various networks such as telecom carrier networks 230, E911 carrier networks 232, and 3G data networks 236 may communicate via the Internet 234 to the devices 244 of the on-site customer network 242 and/or the cloud communication system cluster 102 using SIP links 260.

In accordance with at least some embodiments, the cloud communication system cluster 102 comprises a redundant HTTP load balancer 218 and a redundant SIP load balancer 222 in communication with load balanced telecom application servers 262 and load balanced telecom switches 264 via respective HTTP links 250 and SIP links 260. The redundant HTTP load balancer 218 also is in communication with load balanced configuration servers 266 and load balanced user interface (UI) servers 268. The redundant HTTP load balancer 218 manages distribution of data packets over HTTP links 250 to the load balanced telecom application servers 262, the load balanced telecom switches 264, the load balanced configuration servers 266, and the load balanced user interface (UI) servers 268. Similarly, the redundant SIP load balancer 222 manages distribution of data packets over SIP links 260 to the load balanced telecom application servers 262, and the load balanced telecom switches 264. In operation, the various servers 262, 266, and 268 perform the VOIP services described herein based on applications being executed and data received from database/NFS (network file system) 220 as well as data received from the mobile customer network 202 and/or the on-site customer network 242. In at least some embodiments, the load balanced telecom switches 264 support communication operations and/or packets transfers related to the VOIP services described herein. Further, the balanced telecom application servers 262 and the load balanced UI servers 268 support user access to account information related to the VOIP services described herein. Further, the load balanced configuration servers 266 manage configuration options for the VOIP services described herein.

Without limitation to other embodiments, the load balanced telecom application servers 262, the load balanced telecom switches 264, the load balanced configuration servers 266, the load balanced UI servers 268, and the database/NFS 220 are customized to provide the VOIP services disclosed herein. Meanwhile, the firewall/routers 206, 216, 224, and 240, the redundant HTTP load balancer 218, and the redundant SIP load balancer 222 may correspond to off-the shelf components.

FIG. 3 shows a streamlined call transfer operation 300 for VOIP services in accordance with an embodiment of the disclosure. As shown, the streamlined call transfer operation 300 involves a mobile device 304 in communication with a cloud communication system call transfer controller 302, which may represent logic and/or executable instructions performed by the servers 262, 266, 268 of the cloud communication system cluster 102 described previously. For the streamlined call transfer operation 300, the cloud communication system call transfer controller 302 receives notification of a new call and sends a corresponding call notification to a push notification provider (e.g., push notification provider 106) using a data packet that contains specific information regarding the call in accordance with the notification requirements of the push notification provider. The push notification provider then forwards a push notification to the mobile device 304 via a wireless network facility. This ultimately results in an incoming call display and audible signal or vibration on the mobile device 304. One of the features of the incoming call display is the appearance of a selectable menu item to initiate a call transfer to send an incoming call to a pre-designated transfer target. The streamlined call transfer operations may be enabled, for example, by execution of a client-side telephony application installed on the mobile device 304 in connection with a VOIP service subscription.

In some embodiments, when a displayed transfer button is pressed, the incoming call is transferred automatically to a designated extension. Alternatively, pressing the displayed transfer button may transfer the incoming call to an intermediary as an announcement or screen call that occurs before the call is transferred to the transfer target. The intermediary may talk to the user of the initiator device and screen the incoming phone call. After screening the call, the initiator device may be placed in a hold (ringing) state while the intermediary communicates with the transfer target via voice or text. The user of the transfer target device may complete the transfer by selecting the "transfer" button or icon again to establish a call with the initiator device, and the intermediary is no longer involved. The user of the transfer target device or the intermediary also may select to end the incoming call by selecting a hang up button or a transfer to voice button.

The streamlined call transfer process also may be selected when an incoming call is received by a user who is on a live call with an outside party. In this case, the outside party is automatically placed on hold and then may be redirected to a transfer target extension by the cloud communication system call transfer controller 302. As an option, the transfer target extension may be consulted before the transfer is completed either by selecting a screened transfer function or using a call transfer option that is designated beforehand. The transfer target for transferred calls may be provided to the mobile device 304 as part of a downloadable client-side telephony application compatible with operations of the cloud communication system cluster 102, wherein the current transfer target for the client-side telephony application is based on selections made when the mobile device 304 or subscriber was registered for VOIP services or when an update to the client-side telephony application last occurred. This transfer target can also be expanded to be a group or list of extensions that is presented to the mobile device 304 as a drop-down list from which one extension is chosen by the user as an additional step in the transfer sequence.

In some embodiments, when a call is transferred from a transfer target to another contact or to an intermediary, the other contact or intermediary may talk to the transfer target. Additionally or alternatively, the other contact or intermediary may send the call back to the transfer target with a similar one-touch transfer command back to the transfer target along with an annotation. In this manner, the call comes back to the transfer target from the other contact or the intermediary with an annotation, and the transfer target is able to handle the call appropriately.

In some embodiments, during a new call event, an analysis may be performed on the caller ID of the incoming call and an appropriate transfer target is highlighted on a drop-down list or menu as a result of the analysis. The transfer target data that supports this feature is made available for selection by a user of the mobile device 304 based on an updatable contact list stored by the mobile device 304. As a contact is entered or revised, a query may be presented to the user allowing one or more other contacts to be selected as a call transfer target. For example, it may be desirable to associate one of the company's executive assistants with a call transfer target for all calls arriving from a key customer that is listed on the company's e-commerce website. This customer contact information may be collected from an associated e-commerce website and included as part of the downloadable client-side telephony application. The collection of contact information may occur as part of a registration process for a subscriber to the VOIP service. This key customer information may be updated by a client-side telephony application update process that periodically refers to the associated e-commerce website's key customer listing, and updates customer contact information for VOIP services accordingly. Thus, new caller ID associations can be created for a call transfer feature as customer lists evolve.

In some embodiments, a record of each issued client-side telephony application is stored by a database (e.g., database/NFS 220) of the cloud communication system cluster 102 for future reference. Over time, automatic upgrades or updates to the client-side telephony applications may be configured to include features that become available or that are purchased after an initial subscription. If a mobile device is able to register with more than one communication system, multiple client-side telephony applications may be downloaded and a management interface may be invoked to determine which will take control at runtime.

In some embodiments, the cloud communication system cluster 102 or a related e-commerce storefront is aware of a user's corporate environment or subscriber class. In such case, a certain amount of customization is applied to a client-side telephony application before download, either in form of customized software code or by using specific configuration data that is downloaded as part of, or is otherwise associated with the client-side telephony application. Specifically, a configuration-specific piece of information may be downloaded that affects the user's membership in a corporate environment (e.g., an alias ID or other identifier and an extension may be included). These fields are used to identify the individual mobile device in a corporate, organizational, or other group environment.

As an example, suppose John Williams has two mobile devices. One is used in the car as a built-in unit and John takes the other one along with him. In one mode of operation, the same alias ID and alias display name is assigned to both of John's mobile extension numbers (Alias ID="JD_Williams_Mbl" and Alias display Name="John Williams (mobile)") using extension number 21573 and 21574. When John's name is viewed in the corporate directory, the only name that is displayed is John Williams (mobile). When this name is called, both phones are accessed and "forked" under a Session Initiation Protocol (SIP) command code and John picks up the call on the currently active mobile device. John's phone in the office at extension number 20611 has the Alias ID "JD_Williams_Ofc" and the display name "John Williams (office)". In this case, John's office phone is called only when the appropriate directory name is accessed by a caller or someone sending a message.

It is also possible to have one Alias Display Name (John Williams) assigned to both a mobile device and an office phone. In this case, the caller is not aware of the arrangement of John's phones and simply calls John Williams using the Alias Display Name. When the call is made, all three devices are forked using the SIP and John picks up the call on the appropriate device. In the embodiments disclosed herein, the contact list names or identifiers and any forking options are available for streamlined call transfer operations.

As shown in FIG. 3, the mobile device 304 may display a client-side telephony application user interface 310 that enables set up and updates to streamlined call transfer options. The client-side telephony application user interface 310 may, for example, present a menu 312 to set up or update available call transfer options 314. The call transfer options 314 may include number/list options 316 corresponding to a selectable call transfer target or targets. The number/list options 316 may be a contact list for the user, or a previously selected subset of contacts or contacts from a contact list. Further, the call transfer options 314 may include general message options or announcement/screen call options applied to all call transfers, or individualized message options or announcement call options applied to specific call transfers associated with a particular individual or business.

FIG. 4 shows a mobile device 400 in accordance with an embodiment of the disclosure. The mobile device 400 may, for example, correspond to mobile device 122 of FIG. 1, the devices 204 of FIG. 2, or the mobile device 304 of FIG. 3. As shown, the mobile device 400 comprises a processor 402 coupled to a non-transitory computer readable storage 404 storing a client-side telephony application 410. The mobile device 400 also comprises input devices 430, a display 440, and a network interface 450 coupled to the processor 402.

The mobile device 400 is representative of a smartphone, a cellular phone, a personal digital assistant (PDA), a tablet computer, a laptop computer, or other mobile device configured to communicate with the cloud communication system cluster 102 for VOIP services. The processor 402 is configured to execute instructions read from the non-transitory computer readable storage 404. The processor 402 may be, for example, a general-purpose processor, a digital signal processor, a microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

In some examples, the non-transitory computer readable storage 404 corresponds to random access memory (RAM), which stores programs and/or data structures during runtime of the mobile device 400. For example, during runtime of the mobile device 400, the non-transitory computer readable storage 404 may store the client-side telephony application 410 for execution by the processor 402 to perform the call transfer operations described herein. The client-side telephony application 410 may be distributed to the mobile device 400 via a network connection or via a local storage device corresponding to any combination of non-volatile memories such as semiconductor memory (e.g., flash memory), magnetic storage (e.g., a hard drive, tape drive, etc.), optical storage (e.g., compact disc or digital versatile disc), etc. Regardless the manner in which the client-side telephony application 410 is distributed to the mobile device 400, the code and/or data structures corresponding to the client-side telephony application 410 are loaded into the non-transitory computer readable storage 404 for execution by the processor 402.

The input devices 430 may comprise various types of input devices for selection of data or for inputting of data to the mobile device 400. As an example, the input devices 430 may correspond to a touch screen, a key pad, a keyboard, a cursor controller, or other input devices.

The network interface 450 may couple to the processor 402 to enable the processor 402 to communicate with the cloud communication system cluster 102. For example, the network interface 450 may enable the mobile device 400 to receive VOIP services and/or to update VOIP service options. In different embodiments, the network interface 450 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The network interface 450 may enable the processor 402 to communicate with the Internet or one or more intranets. With such a network connection, it is contemplated that the processor 402 might receive information from the network, or might output information to the network in the course of performing the call transfer features described herein. Such information, which is often represented as a sequence of instructions to be executed using processor 402, may be received from and outputted to the network, for example, in the form of a computer data signal embodied in a carrier wave.

Such information, which may include data or instructions to be executed using processor 402 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 402 executes instructions, codes, computer programs, scripts which it accesses from hard disk, floppy disk, optical disk (these various disk based systems may all be considered secondary storage), read-only memory (ROM), random access memory (RAM), the network interface 450, or the input devices 430. While only one processor 402 is shown, multiple processors may be present. Thus, while instructions may be discussed as executed by a processor, the instructions may be executed simultaneously, serially, or otherwise executed by one or multiple processors.

In accordance with at least some embodiments, the client-side telephony application 410 comprises a login module 412, a user interface module 414, a contact list sync module 416, and a call routing module 420 to support the VOIP services and the streamlined call transfer services described herein. More specifically, the call routing module 420 comprises one-touch transfer options 422 and a number/list 424 related to one-touch transfers.

The login module 412 enables a user of the mobile device 400 to log into a VOIP service corresponding to a communication session established with the cloud communication system cluster 102. After a successful logic, a user interface is presented on the mobile device 400 based on instructions and formatting data in the user interface module 414. The user interface module 414 may provide a user interface that enables the user of the mobile device 400 to make/receive VOIP calls, to select from or update a contact list, to review a call log or voicemails, to select or update call transfer options, or to perform other operations. The contact list sync module 416 enables a user to receive updated contact information from the cloud communication system cluster 102. Such updates may have been previously submitted to the cloud communication system cluster 102 by a user at an on-site computing device. Additionally or alternatively, the cloud communication system cluster 102 may have analyzed customer websites for updated contact information or other otherwise obtained updated information for a contact list corresponding to the client-side telephony application 410.

The call routing module 420, with the one-touch transfer options 422 and the number/list 424, enables the client-side streamlined call transfer operations described herein. In at least some embodiments, execution of the client-side telephony application 410 enables the processor 402 to establish VOIP calls via communication with at least one server and to provide a one-touch call transfer option for the mobile device 400 during a ringing phase. More specifically, the processor 402 may transmit a one-touch transfer command to the at least one server in response to a user selection of a one-touch call transfer button or icon during the ringing phase. In some embodiments, the processor 402 may transmit a transfer target identifier with the one-touch transfer command. Further, execution of the client-side telephony application 410 may cause the processor 402 to display a user interface that enables registration of a transfer target and/or an intermediary associated with a one-touch call transfer option with the at least one server. As an example, the processor 402 may display a contact list associated with a user of the mobile device 400 to enable registration of a transfer target or intermediary with a one-touch call transfer option.

When a call is received, the client-side telephony application 410 may cause the processor 402 to display a selectable one-touch call transfer button during the ringing phase. The display of the selectable one-touch call transfer button occurs when one-touch call transfers has been enabled. If one-touch call transfers have been disabled, the processor 402 does not display the one-touch call transfer button during the ringing phase. Upon selection of the one-touch call transfer button, the client-side telephony application 410 causes the processor to transmit a one-touch call transfer command to at least one server. Further, upon selection of the one-touch call transfer button, the client-side telephony application 410 also may cause the processor 402 to transmit a transfer message instruction as part of the one-touch call transfer command or separate from the one-touch call transfer command. Upon selection of the one-touch call transfer button, the client-side telephony application 410 also may cause the processor 402 to transmit an announcement call instruction as part of the one-touch call transfer command or separate from the one-touch call transfer command. The transfer message option and/or the announcement call option for a call transfer may be enabled or disabled (i.e., toggled between enabled or disabled) by selection of a menu option available by execution of the client-side telephony application 410.

Figure 5:
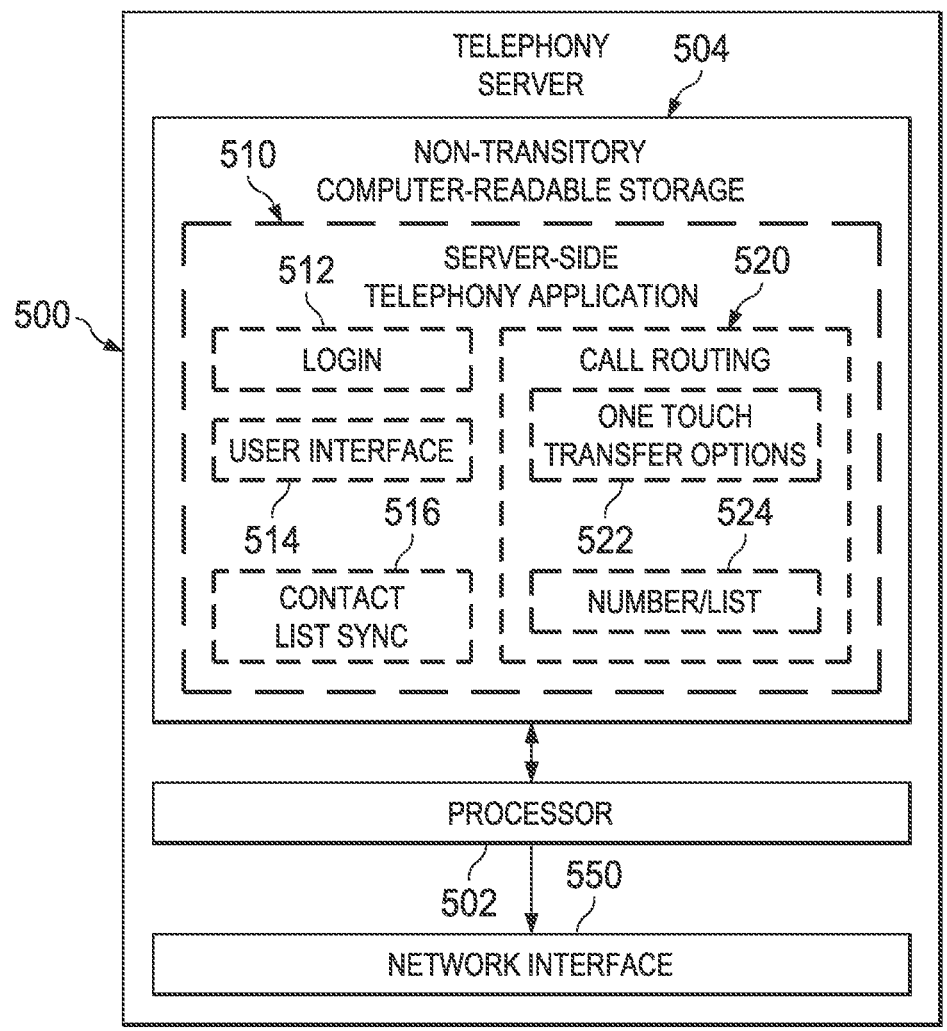
FIG. 5 shows a telephony server in accordance with an embodiment of the disclosure.

FIG. 5 shows a telephony server 500 in accordance with an embodiment of the disclosure. The telephony server 500 may be part of the cloud communication system cluster 102 to provide the VOIP services and server-side streamlined call transfer operations as described herein. As shown, the telephony server 500 comprises a processor 502 and a non-transitory computer-readable storage 504 that stores a server-side telephony application 510. The processor 502 also couples to a network interface 550 that enables network communications as described herein. In accordance with at least some embodiments, the server-side telephony application 510 comprises a login module 512, a user interface module 514, a contact list sync module 516, and a call routing module 520 to support the VOIP services and the streamlined call transfer services described herein. More specifically, the call routing module 520 comprises one-touch transfer options 522 and a number/list 524 related to one-touch transfers.

The login module 512 enables a user of a mobile device (e.g., mobile device 400) to log into a VOIP service corresponding to a communication session established with the cloud communication system cluster 102. The user interface module 514 stores instructions and/or data to enable server-side operations that are compatible with user interface options available on a client-side telephony application. The contact list sync module 516 enables updates for a contact list to be stored and submitted to a mobile device as needed. Such updates may have been previously submitted to the cloud communication system cluster 102 by a user at an on-site computing device. Additionally or alternatively, the cloud communication system cluster 102 may have analyzed customer websites for updated contact information or other otherwise obtained updated information for a contact list.

The call routing module 520, with the one-touch transfer options 522 and the number/list 524, enables the server-side streamlined call transfer operations described herein. In at least some embodiments, execution of the server-side telephony application 510 by the processor 502 causes the telephony server 500 to provide a telephony service that establishes a calling phase between an initiator device and a target device in response to a call command received from the initiator device, and a one-touch transfer service to transfer a call from the target device to a transfer target device in response to a one-touch transfer command received from the target device during the calling phase.

In some embodiments, the one-touch transfer service provided by execution of the server-side telephony application 510 causes the telephony server 500 to register an identifier for the transfer target device and/or intermediary, and to associate the identifier with the one-touch transfer service before the one-touch transfer command is received from the target device. The registration of the identifier for the transfer target device or intermediary device may be based, for example, on one-touch transfer registration input received from the target device. Additionally or alternatively, the registration of the identifier for the transfer target device or the intermediary device may be based on one-touch transfer registration input received from another device associated with a user of the target device.

In some embodiments, the one-touch transfer service provided by execution of the server-side telephony application 510 causes the telephony server 500 to register an identifier for the transfer target device and to associate the identifier with the one-touch transfer service after the one-touch transfer command is received from the target device. In such case, the received one-touch transfer command received from the target device may include the identifier for the transfer target device. In some embodiments, the one-touch transfer service provided by execution of the server-side telephony application 510 causes the telephony server 500 to maintain a contact list associated with a user of the target device (the initial device that receives a call) and to register an identifier for the transfer target device in accordance with a selection of a name, a number, a group, or other identifier from the contact list.

In some embodiments, the one-touch transfer service provided by execution of the server-side telephony application 510 causes the telephony server 500 to send a transfer call notification to a push notification provider in accordance with a predetermined push notification format. Further, the one-touch transfer service provided by execution of the server-side telephony application 510 may cause the telephony server 500 to establish a transfer announcement/screen call to an intermediary. In response, the intermediary may transmit a message via voice or text to the target device to notify the user of the target device regarding a call identify or a priority of an incoming call. Screening an incoming call by an intermediary may enable a priority level to be displayed by a target device once the screening has been completed. Selection of a priority level by an intermediary may be based on one-touch priority level buttons (e.g., high/low priority buttons). Further, the one-touch transfer service provided by execution of the server-side telephony application 510 may cause the telephony server 500 to establish a transfer announcement call in response to receipt of the one-touch transfer command and before the transfer call to the transfer target device is completed. The transfer announcement call ensures that the transfer will be accepted before the transfer call to the transfer target device is completed. To summarize, an intermediary may be used to screen incoming calls to a target device and/or to a target transfer device. One or more intermediaries may communicate with a caller, with a user of the target device, and/or with a user of the transfer target device. The intermediary may use voice or text for communications. Further, the intermediary may have one-touch buttons for selection of information to be relayed to the user of a target device and/or a transfer target device.

Figure 6A:
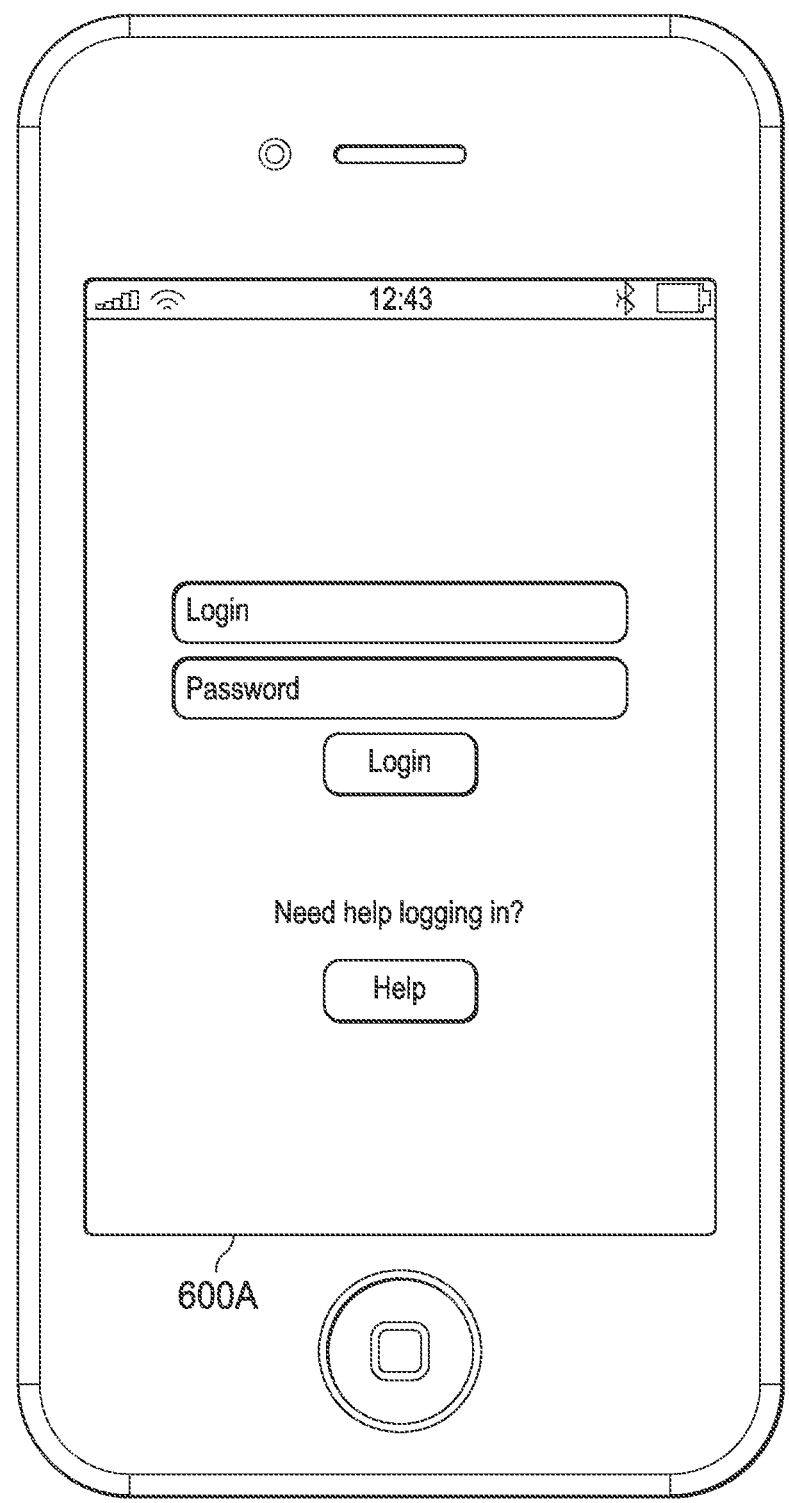
FIGS. 6A-6M shows screenshots of a client-side telephony application in accordance with an embodiment of the disclosure.

Without limitation to other embodiments, FIGS. 6A-6M shows screenshots 600A-600M of a client-side telephony application in accordance with some embodiments of the disclosure. In FIG. 6A, screenshot 600A shows a login screen with a login entry space, a password entry space, a login button, and a help button. Once the login button is pressed, authentication of the information in the login entry space and the password entry space is attempted. If login is successful, a VOIP service session is initiated.

Figure 6B:
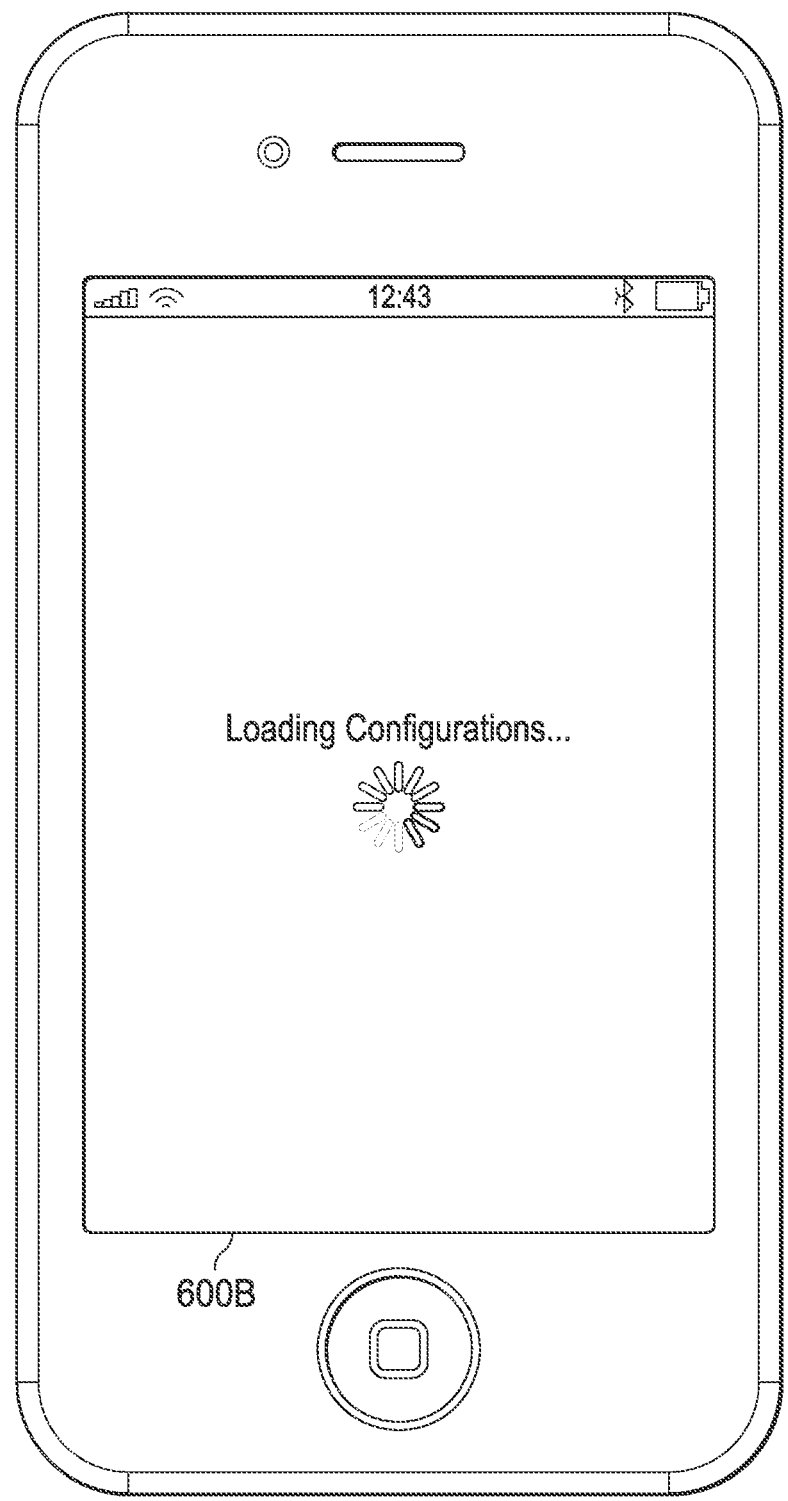

In FIG. 6B, screenshot 600B shows that a VOIP service session begins by loading configuration information. The loading of configuration information may account for updates to the VOIP service, including updates to streamlined call transfer options, that have been stored by the cloud communication system cluster 102, but that are not yet stored on the mobile device executing the client-side telephony application.

Figure 6C:
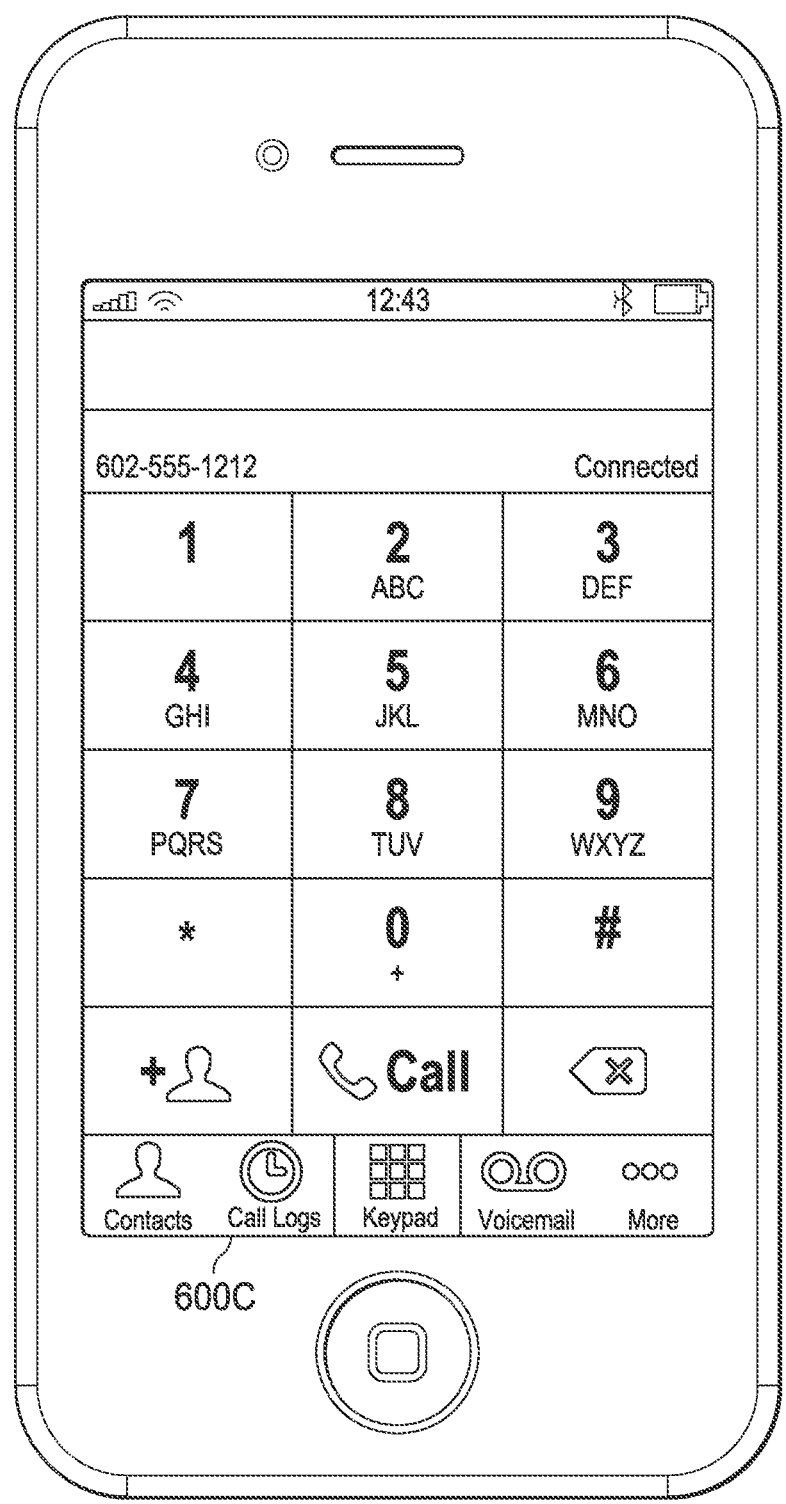
Figure 6D:
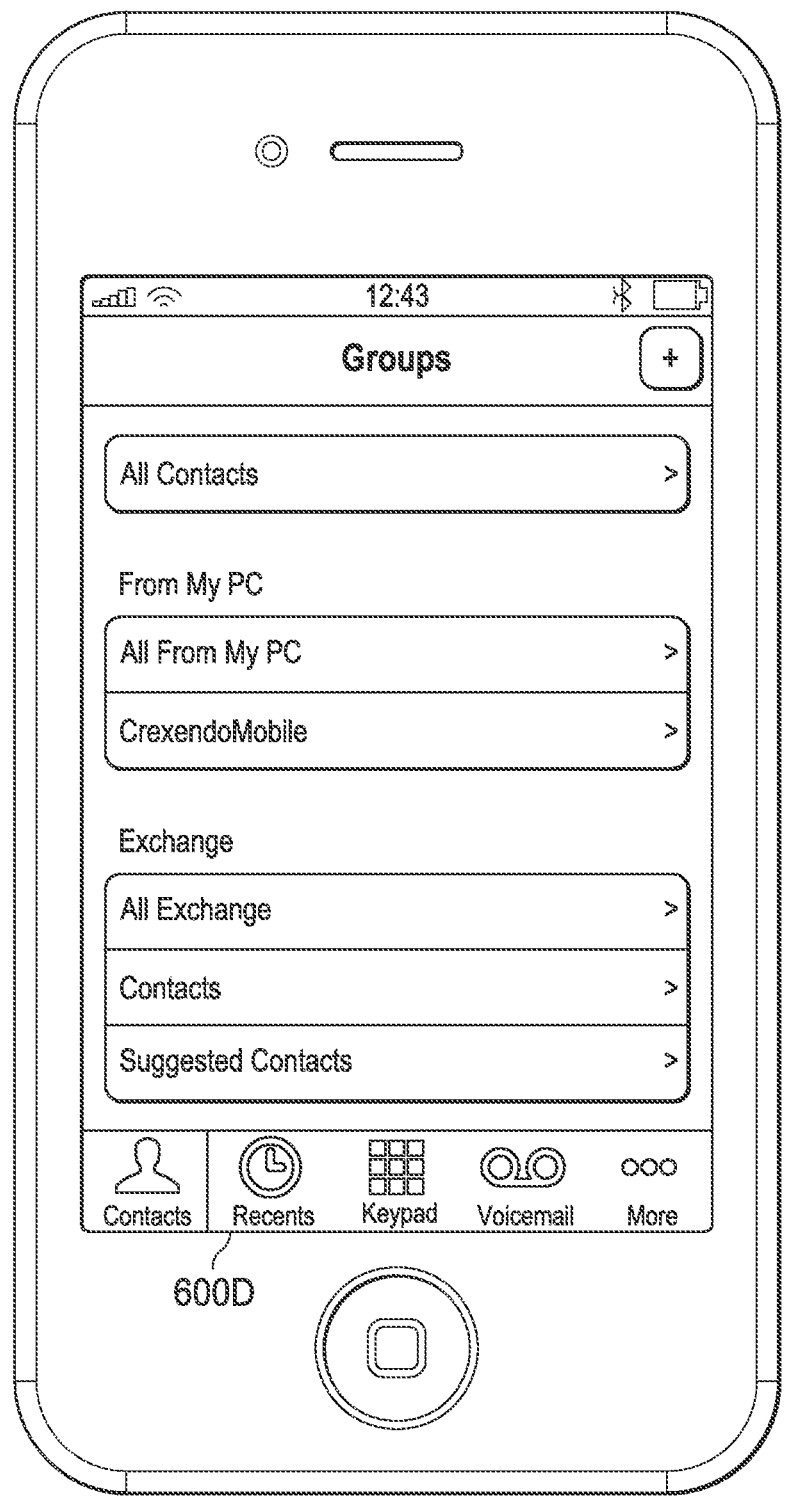

In FIG. 6C, screenshot 600C shows a keypad screen that enables a user to place a call in response to selection of a "keypad" icon. The screenshot 600C also shows other selectable icons or buttons including a "contacts" icon, a "call logs" icon, a "voicemail" icon, and a "more" icon. In FIG. 6D, screenshot 600D shows a contact list that is displayed upon selection of the "contacts" icon for the client-side telephony application. As shown, the contact list may be organized to display contact information organized into different groups such as all contacts, contacts stored locally (on my PC), and contacts stored on an exchange server.

Figure 6E:
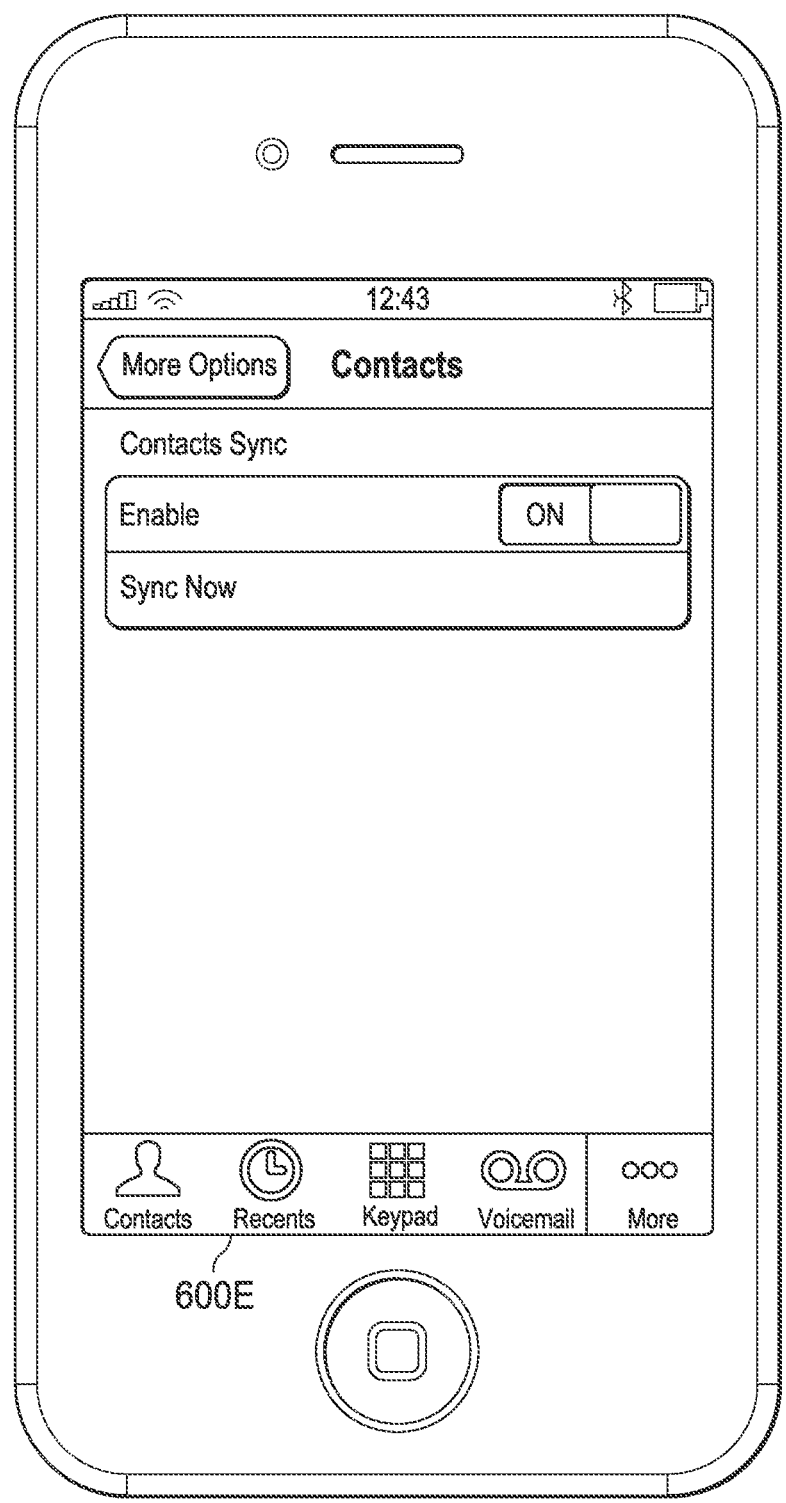
Figure 6F:
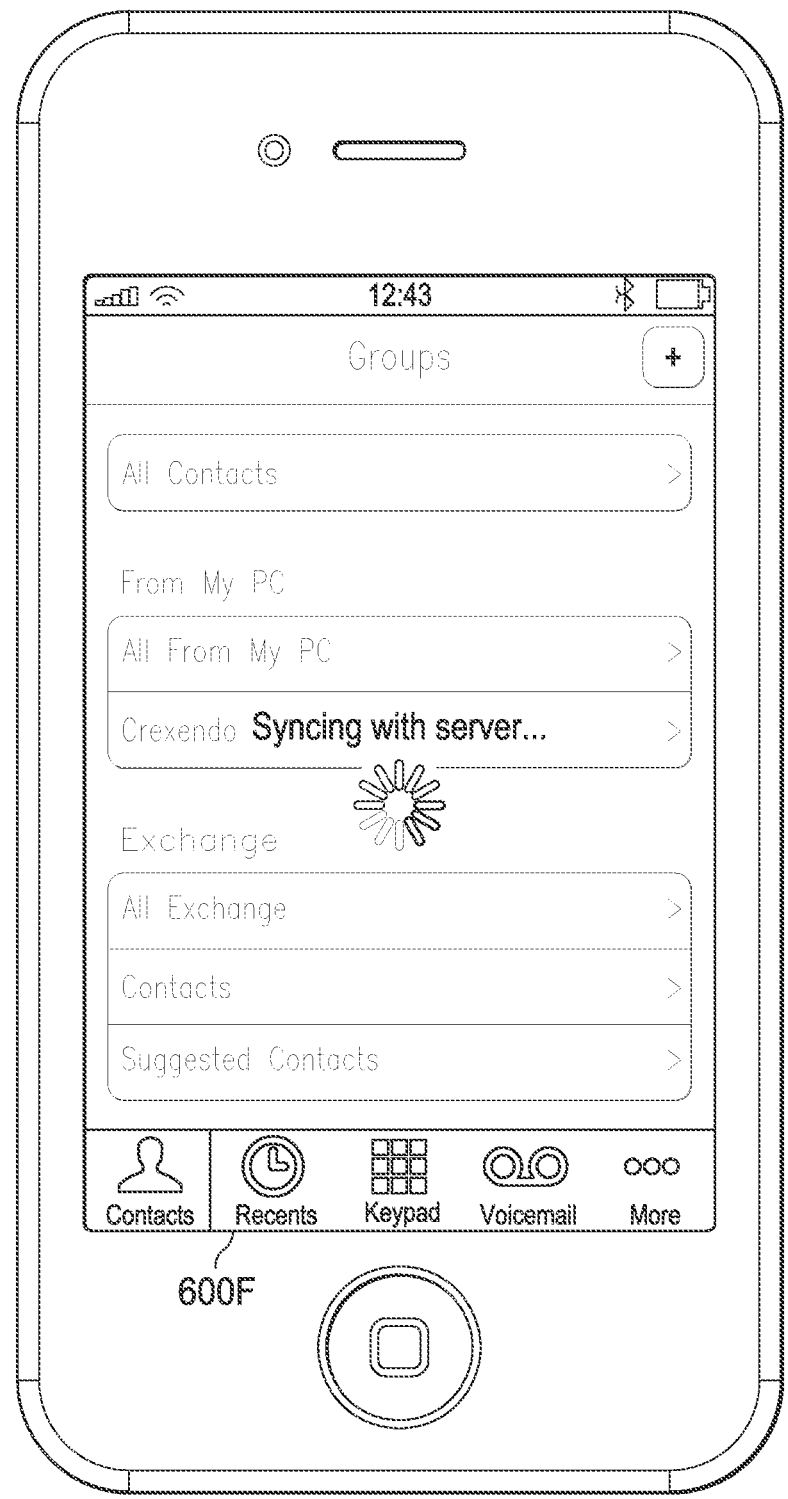
Figure 6G:

In FIG. 6E, screenshot 600E shows a contacts sync feature of the client-side telephony application that is available when the "more" icon is selection. When the contacts sync feature is turned on, the contact list available to the client-side telephony application can be updated via a scheduled or unscheduled sync with a telephony server. Screenshot 600F of FIG. 6F shows a contact list syncing operation. When the contacts sync feature shown in screenshot 600E is turned off, contacts related to the VOIP service are removed and network-based contact list updates are disabled until the contacts sync feature is turned on again. Screenshot 600G of FIG. 6G shows a warning message that may be displayed before finalizing a selection to disable the contacts sync feature.

Figure 6H:
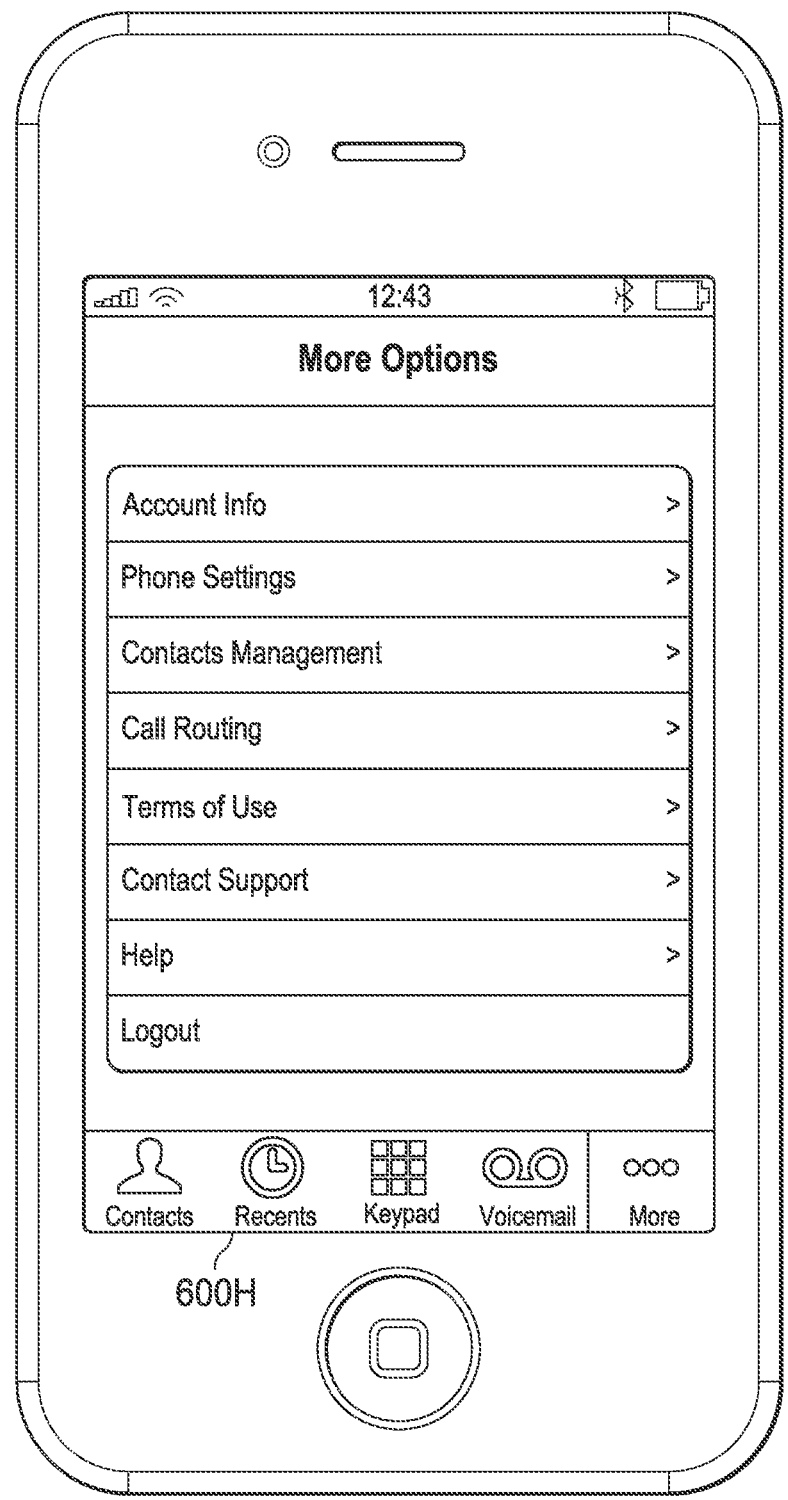
Figure 6I:
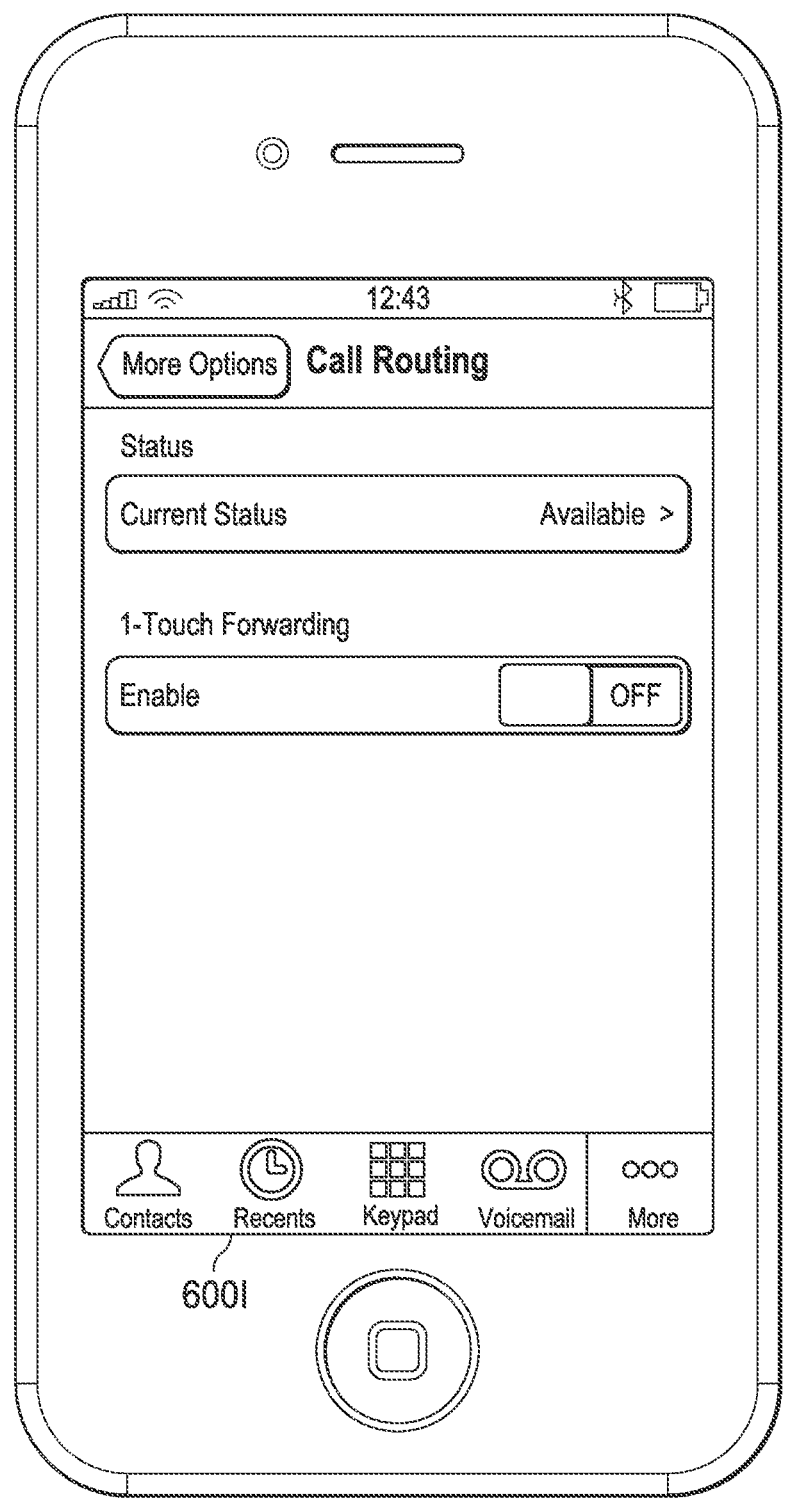
Figure 6J:
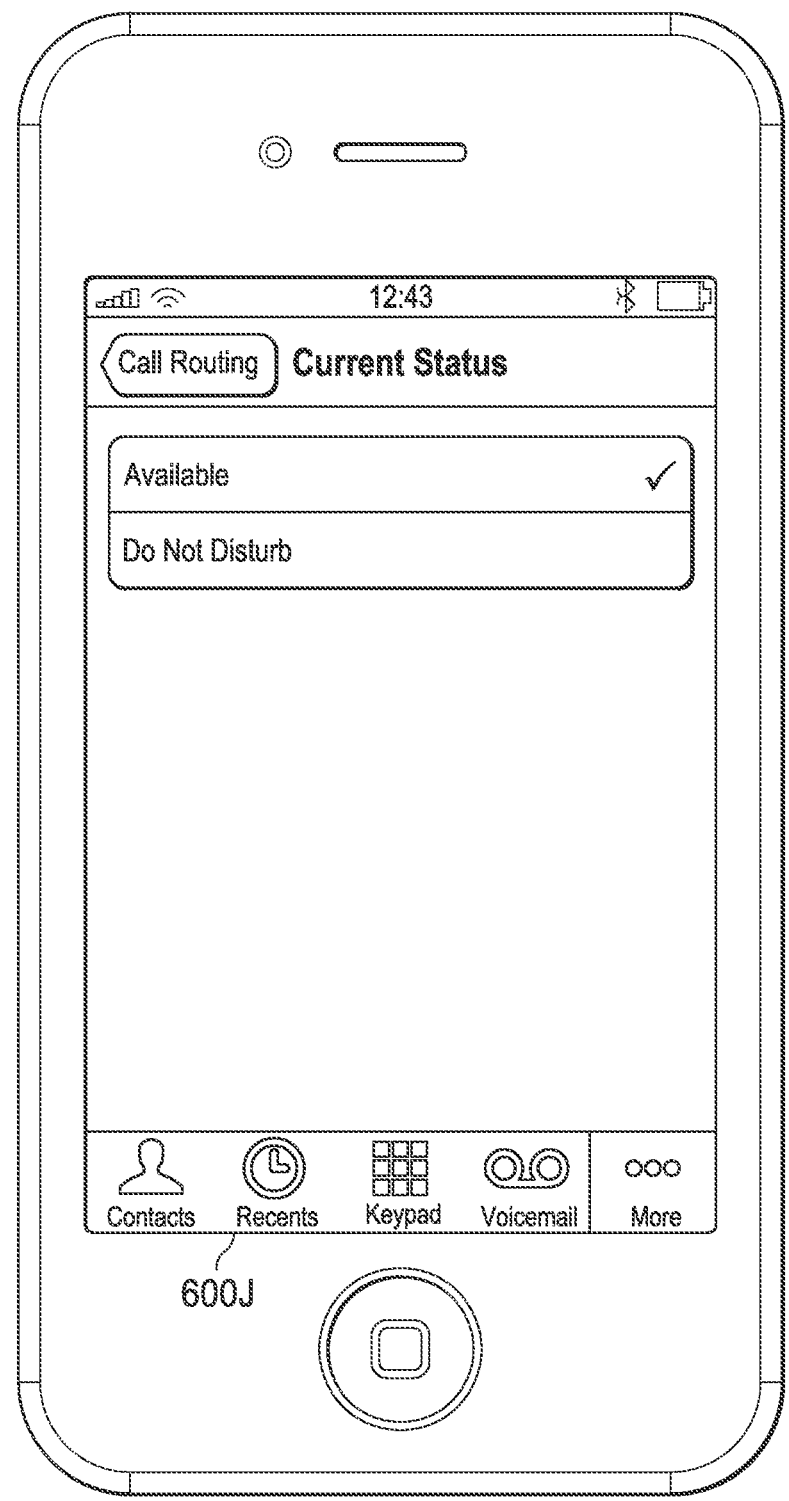

FIG. 6H shows a screenshot 600H that displays various options when the "more" icon of the client-side telephony application is selected. More specifically, selectable tabs for account information, phone settings, contacts management (e.g., to access screenshot 600E), call routing, terms of use, contact support, help, and logout are displayed in screenshot 600H. FIG. 6I shows a screenshot 600I that is displayed in response to selecting the call routing tab of screenshot 600H. In screenshot 600I, one-touch forwarding is shown in an off (disabled) state and may be toggled from the off state to an on state by sliding the corresponding tab. Further, the status of the user may be toggled between available and unavailable ('do not disturb") by pressing the current status tab shown in screenshot 600I. Once the current status tab is pressed, screenshot 600J of FIG. 6J is presented whereby the status can be changed from available to unavailable or vice versa.

Figure 6K:
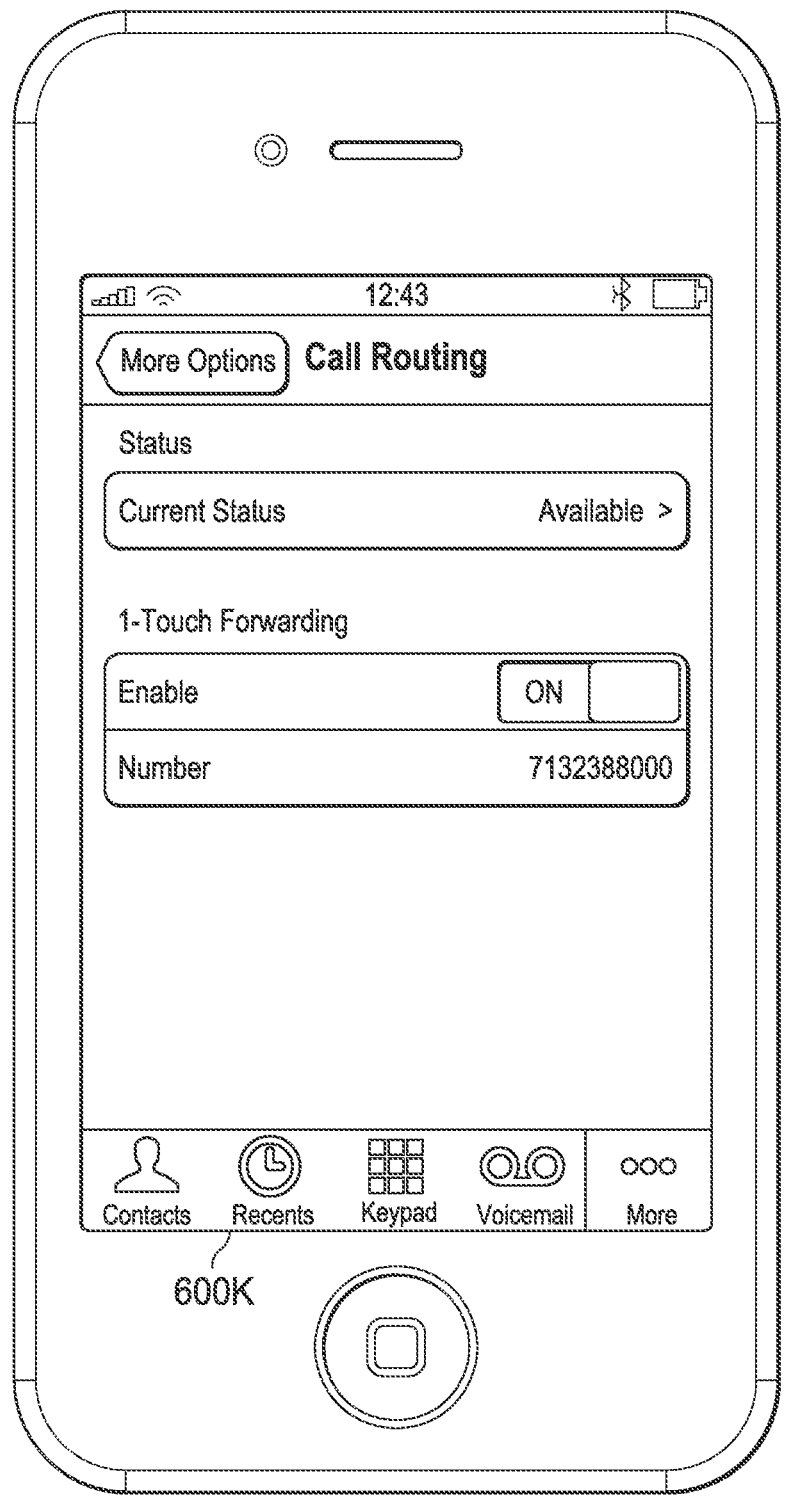
Figure 6L:
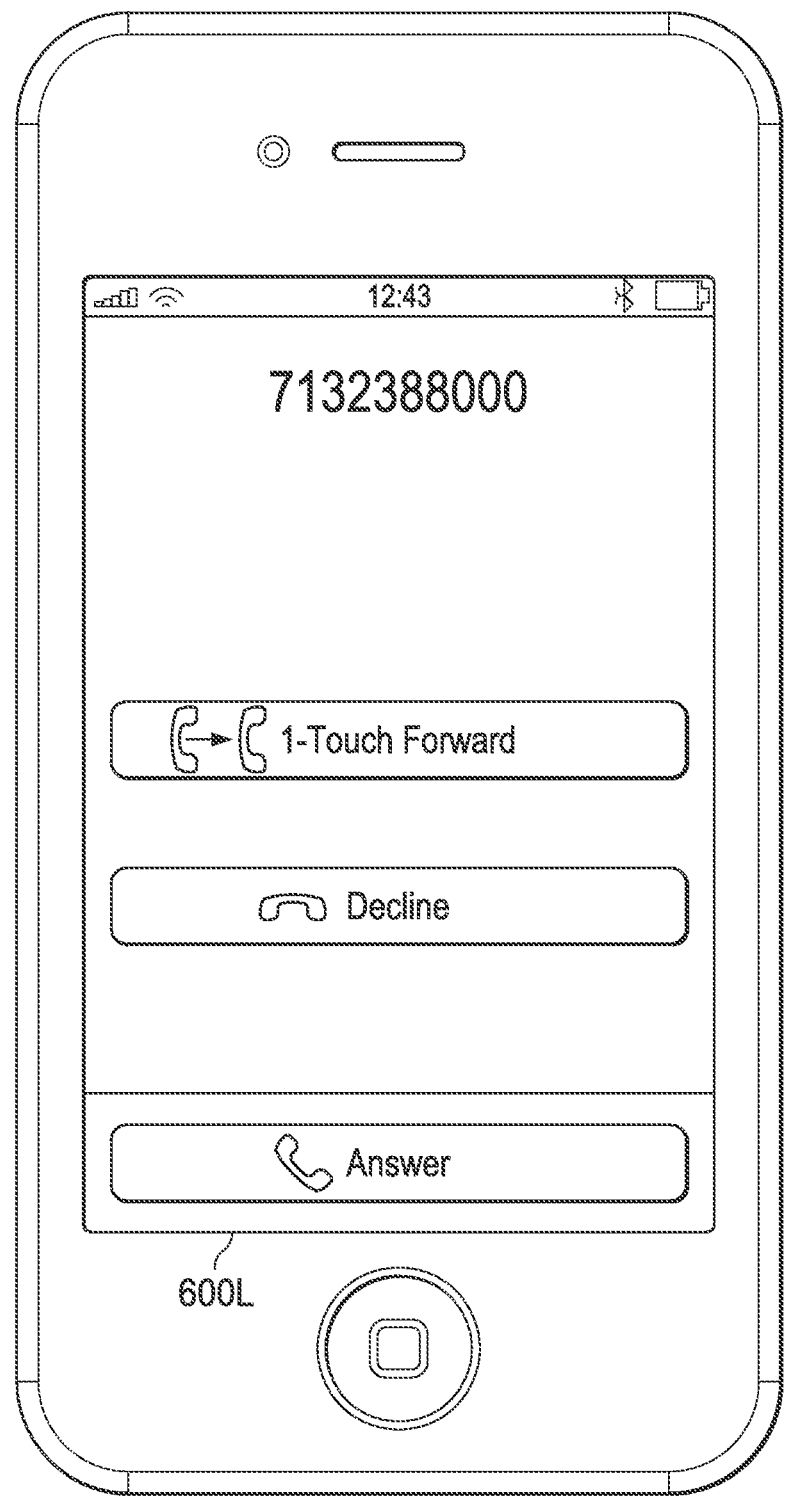
Figure 6M:
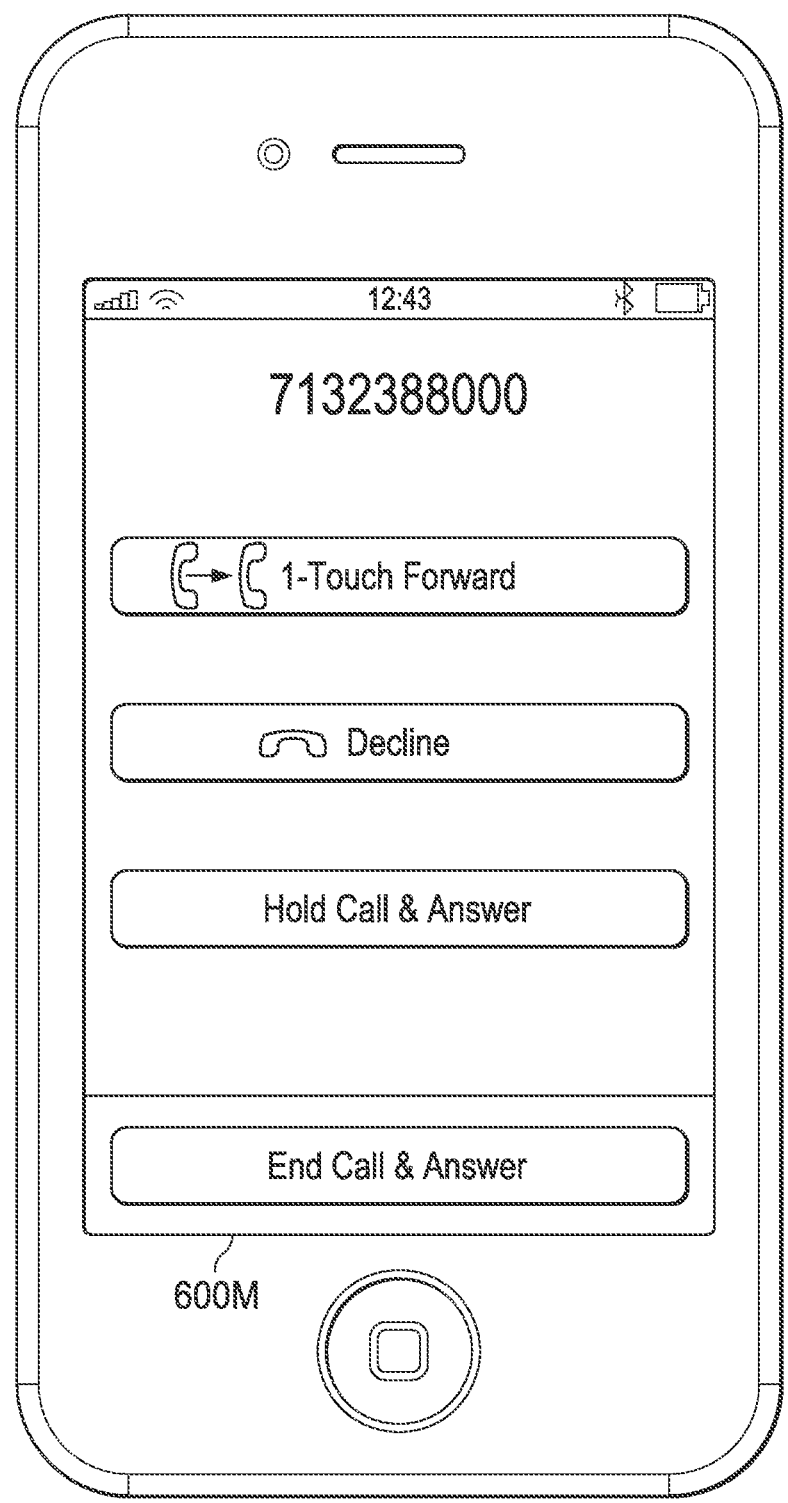

In screenshot 600K of FIG. 6K, one-touch forwarding is shown in an on (enabled) state. In the enabled state, a phone number, extension, name, or alias ID may be reviewed or updated for the one-touch forwarding operation. In screenshot 600L of FIG. 6L, a new call screen is displayed. As shown in screenshot 600L, a user has the option to answer the call, decline the call, or one-touch forward the call to a designated target. In screenshot 600M of FIG. 6M, another new call screen is displayed, where the user is already participating in another call. In such case, the user has the option to end the current call and answer the new call, to hold the current call and answer the new call, to decline the new call, and to one-touch forward the new call to a designated target. Other buttons may be displayed for selection in accordance with the various streamlined call transfer options described herein.

Figure 7:
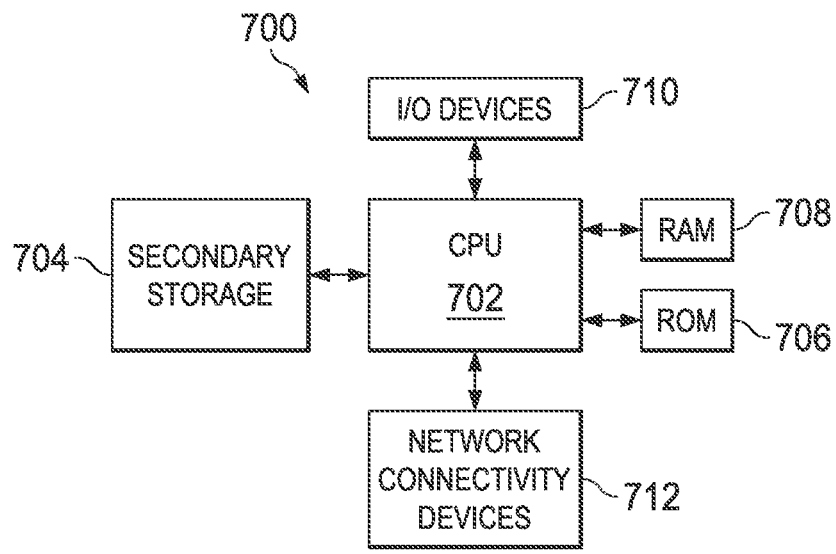
FIG. 7 shows components of a computer system in accordance with an embodiment of the disclosure.

FIG. 7 shows an example of various components of a computer system 700 in accordance with the disclosure. The computer system 700 may perform various operations to support the one-touch transfer operations described herein. The computer system 700 may correspond to components of the mobile device 122, the cloud communication system cluster 102, the devices 204 or 244, the mobile device 304, the mobile device 400, or the telephony server 500 described herein.

As shown, the computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. In the electrical engineering and software engineering arts functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. For example, a design that is still subject to frequent change may be implemented in software, because re-spinning a hardware implementation is more expensive than re-spinning a software design. Meanwhile, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 may be comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the call transfer functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

In some examples, a non-transitory computer-readable storage medium may store telephony instructions that, when executed, cause the processor 702 to establish a calling phase between an initiator device and a target device in response to a call command received from the initiator device. The telephony instructions, when executed, also may cause the processor 702 to transfer a call from the target device to a transfer target device in response to a one-touch transfer command received from the target device during the calling phase.

In at least some embodiments, the telephony instructions, when executed, also may cause the processor 702 to register an identifier for the transfer target device and/or an intermediary, and to associate the identifier with the one-touch transfer service before the one-touch transfer command is received from the target device. Further, the telephony instructions, when executed, also may cause the processor 702 to register an identifier for the transfer target device and/or an intermediary, and to associate the identifier with the one-touch transfer service after the one-touch transfer command is received from the target device. Further, the telephony instructions, when executed, also may cause the processor 702 to maintain a contact list associated with a user of the target device and to register an identifier for the transfer target device and/or an intermediary in accordance with a selection of a name or number from the contact list. Further, the telephony instructions, when executed, also may cause the processor 702 to establish a transfer announcement/screen call in response to receipt of the one-touch transfer command and before the incoming call to the target device and/or the transfer call to the transfer target device is completed. Further, the telephony instructions, when executed, also may cause the processor 702 to transmit screen call results or incoming call prioritization information to a target device. Further, the telephony instructions, when executed, also may cause the processor 702 to provide screen call buttons or incoming call prioritization buttons to simplify selection and communication of screen call results to a target device or to a transfer target device. Further, the telephony instructions, when executed, also may cause the processor 702 to provide a ringing state, a message state, and/or a music state for a call initiator device during wait period for completion of call transfers and call screens. Further, the telephony instructions, when executed, also may cause the processor 702 to perform other operations to set up or utilize streamlined or one-touch transfer services as described herein.

Figure 8:
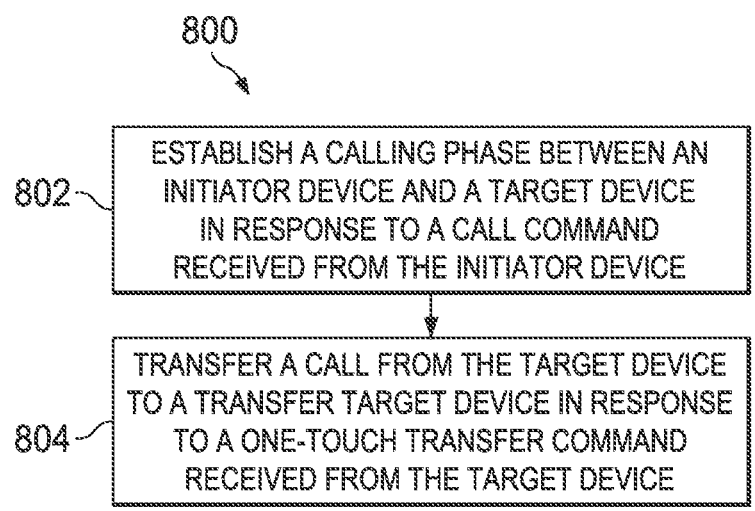
FIG. 8 shows a telephony method in accordance with an embodiment of the disclosure.

FIG. 8 shows a telephony method 800 in accordance with an embodiment of the disclosure. The telephony method 800 may be performed by a telephony server that is part of a cloud communication system cluster 102 as described herein. As shown, the telephony method 800 comprises establishing a calling phase between an initiator device and a target device in response to a call command received from the initiator device (block 802). The method 800 further comprises transferring a call from the target device to a transfer target device in response to a one-touch transfer command received from the target device during the calling phase (block 804).

In at least some embodiments, the method 800 may comprise additional or alternative steps. For example, the method 800 may additionally comprise registering an identifier for the transfer target device and associating the identifier with the one-touch transfer service before the one-touch transfer command is received from the target device. Further, the method 800 may comprise registering an identifier for the transfer target device and associating the identifier with the one-touch transfer service after the one-touch transfer command is received from the target device. Further, the method 800 may comprise maintaining a contact list associated with a user of the target device and registering an identifier for the transfer target device in accordance with a selection of a name or number from the contact list. Further, the method 800 may comprise transmitting a transfer announcement message in response to receipt of the one-touch transfer command and before the transfer call to the transfer target device is completed. Further, the method 800 may comprise establishing a transfer announcement call in response to receipt of the one-touch transfer command and before the transfer call to the transfer target device is completed. Further, the method 800 may comprise performing other operations to set up or utilize one-touch transfer services as described herein.

While several embodiments have been provided in the present disclosure, it should be understood that the disclosed systems and methods may be embodied in many other specific forms without departing from the spirit or scope of the present disclosure. For example, while one-touch button operations are described for the streamlined call transfer operations disclosed herein, voice commands, dedicated hardware buttons, or other streamlined call transfer mechanisms may be used. The present examples are to be considered as illustrative and not restrictive, and the intention is not to be limited to the details given herein. Also, the various elements or components may be combined or integrated in another system or certain features may be omitted or not implemented.

Further, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system, comprising:
at least one server to manage voice over internet protocol (VOIP) services, wherein managed VOIP services provided by the at least one server comprise:
a telephony service to establish a calling phase between an initiator device and a mobile target device in response to a call command received from the initiator device, and
a streamlined call transfer service to:
transfer a call from the mobile target device to a transfer target device in response to a one-touch transfer command received from the mobile target device during the calling phase; and
cause the at least one server to:
extract from the one-touch transfer command an identifier for the transfer target device included in the one-touch transfer command by the mobile target device, wherein the mobile target device is configured to determine an identity of the initiator device, select the transfer target device based on the identity of the initiator device, and uniquely associate each initiator device with a transfer target device;
establish a screening call with two-way voice communication between an intermediary and the initiator device in response to receipt of the one-touch transfer command and before the transfer of the call from the mobile target device to the transfer target device is completed;
establish voice communication between the intermediary and the transfer target device and provide textual call priority information from the intermediary to the target transfer device before the transfer of the call from the mobile target device to the transfer target device;
establish voice communication between the intermediary and the mobile target device and provide textual call priority information from the intermediary to the mobile target device before the transfer of the call from the mobile target device to the transfer target device; and
complete the transfer of the call to the transfer target device and disconnect the intermediary from the initiator device and the transfer target device responsive to a one-touch transfer command received from the transfer target device;
collect contact information from a website associated with the initiator device, and associate a given transfer target device with a previously unidentified initiator device identified in the contact information; and one or more VOIP applications executable by the mobile target device:
  wherein at least one of the VOIP applications comprises a management interface configured to determine which of the VOIP applications will be executed based on the mobile target device being registered with multiple communication systems;
  wherein at least one of the VOIP applications is configured to:
    selectably display a one-touch transfer button responsive to receipt of the call from the initiator device and based on enablement of one touch transfers by selection via a user interface of the mobile target device; and
    disable updating of contact information stored by the mobile target device with information received from the server and remove from the mobile target device contact information previously received from the server responsive to selection of contact synchronization disable via the user interface of the mobile target device.

2. The system of claim 1, wherein the streamlined call transfer service comprises the at least one server registering an identifier for the transfer target device and associating the identifier with the streamlined call transfer service before the one-touch transfer command is received from the mobile target device.

3. The system of claim 2, wherein said registration of the identifier for the transfer target device is based on one-touch transfer registration input received from the mobile target device.

4. The system of claim 2, wherein said registration of the identifier for the transfer target device is based on one-touch transfer registration input received from another device associated with a user of the mobile target device.

5. The system of claim 1, wherein the streamlined call transfer service comprises the at least one server registering an identifier for the transfer target device and associating the identifier with the streamlined transfer service after the one-touch transfer command is received from the mobile target device.

6. The system of claim 5, wherein the received one-touch transfer command comprises the identifier for the transfer target device.

7. The system of claim 1, wherein the streamlined call transfer service comprises the at least one server maintaining a contact list associated with a user of the mobile target device and registering an identifier for the transfer target device in accordance with a selection of a name or number from the contact list.

8. The system of claim 1, wherein the streamlined call transfer service comprises the at least one server sending a transfer call notification to a push notification provider in accordance with a predetermined push notification format.

9. The system of claim 1, wherein the streamlined call transfer service comprises the at least one server establishing a screening call with an intermediary in response to receipt of the one-touch transfer command and before the incoming call to the target device is completed.

10. The system of claim 1, wherein the streamlined call transfer service comprises the at least one server receiving a call screen command from the transfer target device during the calling phase, establishing a call between the initiator device and an intermediary device, receiving an annotation from the intermediary device, and renewing the calling phase between the initiator device and the target device, wherein the annotation from the intermediary device is displayed during the renewed calling phase.

11. The system of claim 1, the streamlined call transfer service comprises the at least one server establishing a transfer announcement call in response to receipt of the one-touch transfer command and before the transfer call to the transfer target device is completed.

12. A method, comprising:
  establishing, by a telephony server, a calling phase between an initiator device and a mobile target device in response to a call command received from the initiator device;
  selecting, by the mobile target device, a transfer target device based on analysis of identification of the initiator device by the mobile target device, wherein the mobile target device is configured to uniquely associate each initiator device with a transfer target device;
  transmitting, by the mobile target device, a one-touch transfer command that includes identification for the transfer target device to the telephony server:
  extracting, by the telephony server, the identification for the transfer target device from the one-touch transfer command:
  transferring, by the telephony server, a call from the mobile target device to the transfer target device in response to a one-touch transfer command received from the mobile target device during the calling phase;
  establishing, by the telephony server, prior to completion of the transferring, a screening call with two-way voice communication between an intermediary and the initiator device in response to receipt of the one-touch transfer command; and
  establishing, by the telephony server, prior to completion of the transferring, voice communication between the intermediary and the transfer target device, and providing textual priority information from the intermediary to the transfer target device;
  establishing, by the telephony server, prior to completion of the transferring, voice communication between the intermediary and the mobile target device, and providing textual priority information from the intermediary to the mobile target device;
  completing the transferring of the call to the transfer target device and disconnecting the intermediary from the initiator device and the transfer target device responsive to a one-touch transfer command received from the transfer target device;
  collecting contact information from a website associated with the initiator device, and associating a given transfer target device with a previously unidentified initiator device based on the contact information:
  determining, by the mobile target device, which of a plurality of VOIP applications stored on the mobile device will be executed based on the mobile target device being registered with multiple communication systems;
  selectably displaying, by the mobile target device, a one-touch transfer button responsive to receipt of the call from the initiator device and based on enablement of one touch transfers by selection via a user interface of the mobile target device; and
  disabling updating of contact information stored by the mobile target device with information received from the server and removing from the mobile target device contact information previously received from the server responsive to selection of contact synchronization disable via the user interface of the mobile target device.

13. The method of claim 12, further comprising registering an identifier for the transfer target device and establishing a call between the initiator device and the transfer target based on the registered identifier.

14. The method of claim 12, further comprising maintaining a contact list associated with a user of the target device and registering an identifier for the transfer target device in accordance with a selection of a name or number from the contact list.

15. The method of claim 12, further comprising providing a communication from the intermediary to the target device after the screening call.

16. A mobile communication device, comprising:
a processor; and
a non-transitory computer-readable medium storing a telephony application, wherein the telephony application, when executed, causes the processor to:
establish voice over internet protocol (VOIP) calls via communication with at least one server;
provide a one-touch call transfer option for the mobile communication device during a ringing phase;
display a user interface that enables to a user to toggle between enabling and disabling a call screening feature for the one-touch call transfer option;
select a transfer target device based on analysis, by the mobile communication device, of identification of an initiator device from which a call originates, wherein the mobile communication device is configured to uniquely associate each initiator device with a transfer target device;
construct a one-touch transfer command that includes identification for the selected transfer target device;
transmit the one-touch transfer command to the at least one server in response to a user selection of a one-touch call transfer button during the ringing phase to cause the at least one server to transfer the call to the transfer target device;
transmit to the at least one server, as part of the one-touch transfer command, an announcement call instruction to cause the at least one server to establish a transfer announcement call prior to completion of call transfer;
transmit the one-touch transfer command to the at least one server in response to user selection of the one-touch call transfer button to cause the at least one server to transfer the call to the mobile communication device and disconnect an intermediary from a device initiating the call and the mobile communication device;
provide voice communication between the mobile communication device and an intermediary and receive textual priority information from the intermediary before the transfer of the call from the mobile communication device to the transfer target device;
determine which of a plurality of VOIP applications stored in the mobile communication device will be executed based on the mobile communication device being registered with multiple communication systems;
selectably display the one-touch transfer button responsive to receipt of the call from the initiator device and based on enablement of one touch transfers by selection via a user interface of the mobile communication device; and
disable updating of contact information stored by the mobile communication device with information received from the server and remove from the mobile communication device contact information previously received from the server responsive to selection of contact synchronization disable via the user interface of the mobile communication device.

17. The mobile communication device of claim 16, wherein the telephony application, when executed, causes the processor to transmit a transfer target device identifier with the one-touch transfer command.

18. The mobile communication device of claim 16, wherein the telephony application, when executed, causes the processor to display a user interface that enables registration of a transfer target device associated with the one-touch call transfer option with the at least one server.

19. The mobile communication device of claim 17, wherein the telephony application, when executed, causes the processor to display a contact list associated with a user of the mobile communication device to enable registration of a transfer target device or an intermediary with the one-touch call transfer option.

20. The mobile communication device of claim 16, wherein the telephony application, when executed, causes the processor to display a selectable one-touch call transfer button during the ringing phase.

21. The mobile communication device of claim 16, wherein the telephony application, when executed, causes the processor to display a user interface that enables to a user to toggle between enabling and disabling the one-touch call transfer option.

22. The mobile communication device of claim 16, wherein the telephony application, when executed, causes the processor to display a user interface that enables to a user to toggle between enabling and disabling a call screening annotation feature for the one-touch call transfer option.

23. A non-transitory computer-readable medium storing a telephony application that, when executed, causes a processor to:
establish voice over internet protocol (VOIP) calls via communication with at least one server;
provide a one-touch call transfer option for a mobile communication device during a ringing phase;
display a user interface that enables to a user to toggle between enabling and disabling a call screening feature for the one-touch call transfer option;
select a transfer target device based on analysis, by the mobile communication device, of identification of an initiator device from which a call originates, wherein the mobile communication device is configured to uniquely associate each initiator device with a transfer target device;
construct a one-touch transfer command that includes identification for the selected transfer target device;
transmit the one-touch transfer command to the at least one server in response to a user selection of a one-touch call transfer button during the ringing phase to cause the at least one server to transfer the call to the transfer target device;
transmit to the at least one server, as part of the one-touch transfer command, an announcement call instruction to cause the at least one server to establish a transfer announcement call prior to completion of call transfer; and
transmit the one-touch transfer command to the at least one server in response to user selection of the one-touch call transfer button to cause the at least one server to transfer the call to the mobile communication device and disconnect an intermediary from a device initiating the call and the mobile communication device;

provide voice communication between the mobile communication device and an intermediary and receive textual priority information from the intermediary before the transfer of the call from the mobile communication device to the transfer target device;

determine which of a plurality of VOIP applications stored in the mobile communication device will be executed to process the call based on the mobile communication device being registered with multiple communication systems;

selectably display the one-touch transfer button responsive to receipt of the call from the initiator device and based on enablement of one touch transfers by selection via a user interface of the mobile communication device; and disable updating of contact information stored by the mobile communication device with information received from the server and remove from the mobile communication device contact information previously received from the server responsive to selection of contact synchronization disable via the user interface of the mobile communication device.

24. The non-transitory computer-readable medium of claim 23, wherein the telephony application, when executed, further causes the processor to transmit a transfer target device identifier with the one-touch transfer command.

25. The non-transitory computer-readable medium of claim 23, wherein the telephony application, when executed, further causes the processor to display a user interface that enables registration of a transfer target device or intermediary associated with the one-touch call transfer option with the at least one server.

26. The non-transitory computer-readable medium of claim 23, wherein the telephony application, when executed, further causes the processor to display a contact list associated with a user of the mobile communication device to enable registration of a transfer target device with the one-touch call transfer option.

27. The non-transitory computer-readable medium of claim 23, wherein the telephony application, when executed, further causes the processor to display a selectable one-touch call transfer button during the ringing phase.

28. The non-transitory computer-readable medium of claim 23, wherein the telephony application, when executed, further causes the processor to display a user interface that enables to a user to toggle between enabling and disabling the one-touch call transfer option.

29. The non-transitory computer-readable medium of claim 23, wherein the telephony application, when executed, further causes the processor to display a user interface that enables to a user to toggle between enabling and disabling an call screening annotation feature for the one-touch call transfer option.

* * * * *